United States Patent
Endo et al.

(10) Patent No.: US 11,632,039 B2
(45) Date of Patent: Apr. 18, 2023

(54) INTEGRATED CIRCUIT AND POWER SUPPLY CIRCUIT

(71) Applicant: FUJI ELECTRIC CO., LTD., Kawasaki (JP)

(72) Inventors: Yuta Endo, Matsumoto (JP); Takato Sugawara, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 102 days.

(21) Appl. No.: 17/458,675

(22) Filed: Aug. 27, 2021

(65) Prior Publication Data

US 2022/0149722 A1 May 12, 2022

(30) Foreign Application Priority Data

Nov. 6, 2020 (JP) .............................. JP2020-186096

(51) Int. Cl.
| | |
|---|---|
| *H02M 1/42* | (2007.01) |
| *H02M 7/539* | (2006.01) |
| *H02M 7/217* | (2006.01) |
| *H02M 1/08* | (2006.01) |

(52) U.S. Cl.
CPC .......... *H02M 1/4225* (2013.01); *H02M 1/08* (2013.01); *H02M 7/2176* (2013.01); *H02M 7/539* (2013.01)

(58) Field of Classification Search
CPC .... H02M 1/08; H02M 1/4225; H02M 7/2176; H02M 7/539
See application file for complete search history.

(56) References Cited

U.S. PATENT DOCUMENTS

| | | | | |
|---|---|---|---|---|
| 5,592,128 A | | 1/1997 | Hwang | |
| 5,689,176 A | | 11/1997 | Deloy | |
| 6,946,819 B2 | * | 9/2005 | Fagnani | .............. H02M 1/4225 |
| | | | | 323/222 |
| 6,984,963 B2 | * | 1/2006 | Pidutti | ................ H02M 1/4225 |
| | | | | 323/222 |
| 7,538,525 B2 | * | 5/2009 | Kim | ..................... H02M 1/4225 |
| | | | | 323/205 |
| 2019/0305664 A1 | * | 10/2019 | Iyasu | .................... H02M 7/539 |

FOREIGN PATENT DOCUMENTS

| | | |
|---|---|---|
| JP | 2006-094697 A | 4/2006 |
| JP | 2015-039261 A | 2/2015 |
| WO | 2018/087960 A1 | 5/2018 |

* cited by examiner

*Primary Examiner* — Yemane Mehari
(74) *Attorney, Agent, or Firm* — Rabin & Berdo, P.C.

(57) ABSTRACT

An integrated circuit for a power supply circuit. The integrated circuit includes an oscillator circuit configured to output an oscillator voltage that rises with a predetermined slope from a first voltage, upon an inductor current of the power supply circuit becoming smaller than a first predetermined value, an error voltage output circuit configured to output an error voltage corresponding to a difference between a reference voltage and a feedback voltage corresponding to the output voltage, a drive circuit configured to turn on and off a transistor of the power supply circuit respectively upon the inductor current becoming smaller than the first predetermined value, and upon the oscillator voltage reaching a second voltage that is based on the error voltage, and an output circuit configured to change the first and/or second voltage based on a rectified voltage obtained by full-wave rectification of the AC voltage, and to output the changed voltage.

19 Claims, 28 Drawing Sheets

INTEGRATED CIRCUIT AND POWER SUPPLY CIRCUIT

CROSS-REFERENCE TO RELATED APPLICATION

The present application claims priority pursuant to 35 U.S.C. § 119 from Japanese patent application number 2020-186096 filed on Nov. 6, 2020, the entire disclosure of which is hereby incorporated by reference herein.

BACKGROUND

Technical Field

The present disclosure relates to an integrated circuit and a power supply circuit.

Description of the Related Art

In general, there are integrated circuits that improve a power factor by shaping a waveform of an alternating current (AC) voltage and a waveform of an input current into similar waveforms (for example, U.S. Pat. No. 7,538,525, U.S. Patent Application Publication No. 2019/0305664, WO2018/087960, U.S. Pat. Nos. 6,946,819, 6,984,963, 5,689,176, 5,592,128, Japanese Patent Application Publication No. 2015-039261, and Japanese Patent Application Publication No. 2006-094697).

When the AC voltage is applied to an input capacitor of an AC-DC converter, a distortion may occur in the input current, and the power factor is degraded accordingly.

The present disclosure is directed to provision of an integrated circuit that appropriately changes an input current to improve a power factor.

SUMMARY

A first aspect of an integrated circuit according to the present disclosure for a power supply circuit that generates an output voltage from an alternating current (AC) voltage inputted thereto, the power supply circuit including a first capacitor to which a voltage corresponding to the AC voltage is to be applied, an inductor to which the voltage corresponding to the AC voltage is to be applied, and a transistor configured to control an inductor current flowing through the inductor, the integrated circuit being configured to switch the transistor, the integrated circuit comprising: an oscillator circuit configured to output an oscillator voltage that rises with a predetermined slope from a first voltage, upon the inductor current becoming smaller than a first predetermined value; an error voltage output circuit configured to output an error voltage corresponding to a difference between a reference voltage and a feedback voltage corresponding to the output voltage; a drive circuit configured to turn on the transistor upon the inductor current becoming smaller than the first predetermined value, and turn off the transistor upon the oscillator voltage reaching a second voltage that is based on the error voltage; and an output circuit configured to change at least one voltage out of the first and second voltages based on a rectified voltage obtained by full-wave rectification of the AC voltage, such that an on-time of the transistor decreases when a level of the rectified voltage rises, and to output the changed at least one voltage.

A second aspect of an integrated circuit according to the present disclosure for a power supply circuit that generates an output voltage from an alternating current (AC) voltage inputted thereto, the power supply circuit including a first capacitor to which a voltage corresponding to the AC voltage is to be applied, an inductor to which the voltage corresponding to the AC voltage is to be applied, and a transistor configured to control an inductor current flowing through the inductor, the integrated circuit being configured to switch the transistor, the integrated circuit comprising: an oscillator circuit configured to output an oscillator voltage that rises upon the inductor current becoming smaller than a predetermined value; an error voltage output circuit configured to output an error voltage corresponding to a difference between a reference voltage and a feedback voltage corresponding to the output voltage; and a drive circuit configured to turn on the transistor upon the inductor current becoming smaller than the predetermined value, and turn off the transistor upon the oscillator voltage reaching the error voltage, wherein the oscillator circuit is further configured to change a slope of the oscillator voltage such that an on-time of the transistor decreases when a level of a rectified voltage obtained by full-wave rectification of the AC voltage rises, and increases when the output voltage drops, and output the oscillator voltage with the changed slope.

An aspect of a power supply circuit according to the present disclosure configured to generate an output voltage from an alternating current (AC) voltage inputted thereto, the power supply circuit comprising: a first capacitor to which a voltage corresponding to the AC voltage is to be applied; an inductor to which the voltage corresponding to the AC voltage is to be applied; a transistor configured to control an inductor current flowing through the inductor; and an integrated circuit configured to switch the transistor, the integrated circuit including an oscillator circuit configured to output an oscillator voltage that rises with a predetermined slope from a first voltage upon the inductor current becoming smaller than a predetermined value, an error voltage output circuit configured to output an error voltage corresponding to a difference between a reference voltage and a feedback voltage corresponding to the output voltage, a drive circuit configured to turn on the transistor upon the inductor current becoming smaller than the predetermined value and turn off the transistor upon the oscillator voltage reaching a second voltage that is based on the error voltage, and an output circuit configured to change at least one voltage out of the first and second voltages based on a rectified voltage obtained by full-wave rectification of the AC voltage, such that an on-time of the transistor decreases when a level of the rectified voltage rises, and to output the changed at least one voltage.

BRIEF DESCRIPTION OF THE DRAWINGS

FIG. 1 is a diagram illustrating an example of an AC-DC converter 10a.

FIG. 2 is a diagram illustrating an example of a power factor correction IC 26a.

FIG. 5 is a diagram illustrating an operation of a power factor correction IC 26a.

DETAILED DESCRIPTION

At least following matters will become apparent from the descriptions of the present specification and the accompanying drawings.

Embodiment

Figure 1:
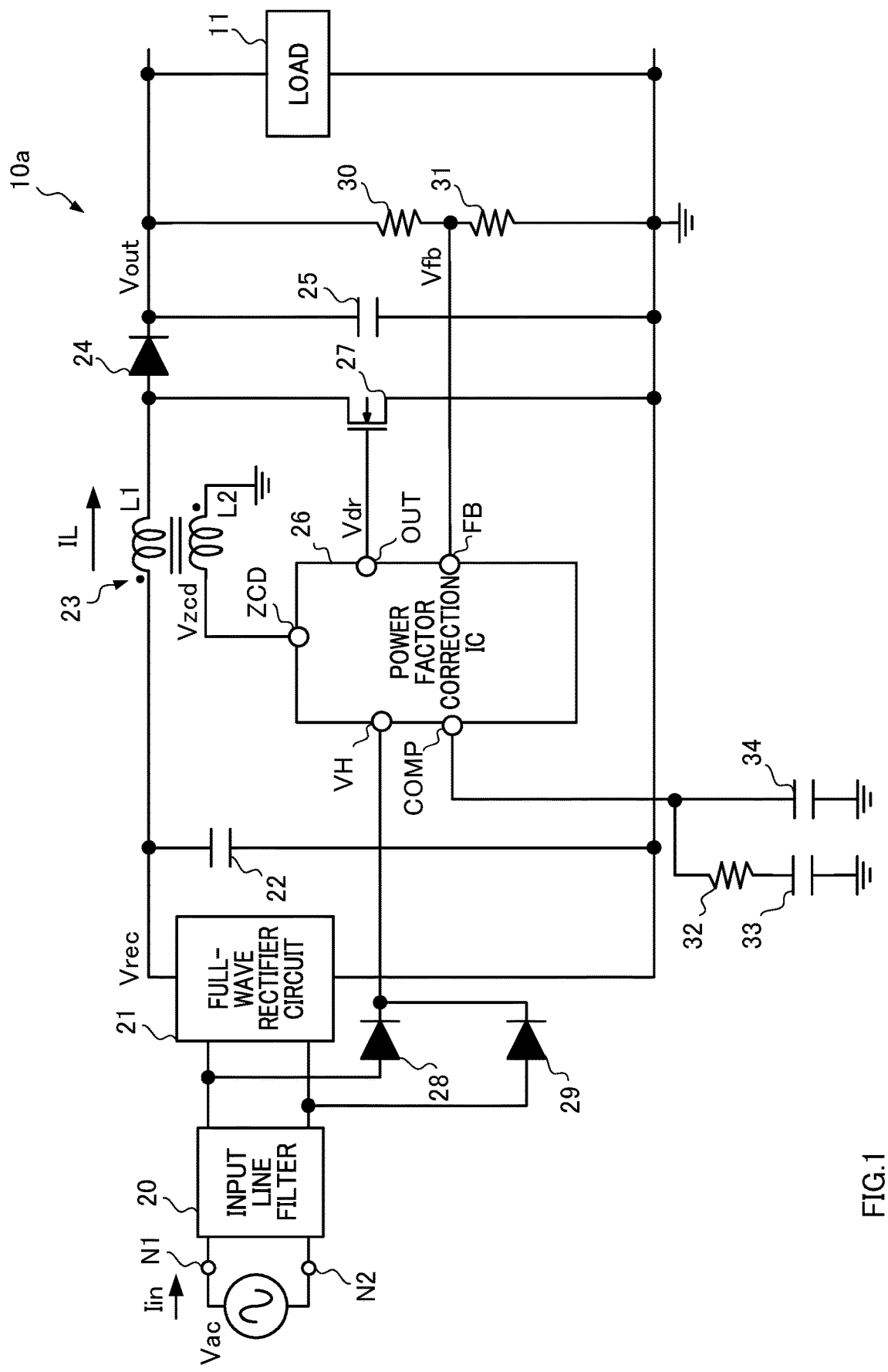

FIG. 1 is a diagram illustrating an example of a configuration of an AC-DC converter 10a according to an embodiment of the present disclosure. The AC-DC converter 10a is a boost chopper type power supply circuit that generates an output voltage Vout at a target level from an alternating-current (AC) voltage Vac of a commercial power supply.

A load 11 is, for example, a DC-DC converter or an electronic device that operates on a direct-current (DC) voltage.

<<<Overview of AC-DC Converter 10a>>>

The AC-DC converter 10a includes an input line filter 20, a full-wave rectifier circuit 21, capacitors 22, 25, 33, and 34, a transformer 23, diodes 24, 28, and 29, a power factor correction IC 26, an n-type metal-oxide-semiconductor (NMOS) transistor 27, and resistors 30 to 32.

The input line filter 20 is provided between nodes N1 and N2 to which the AC voltage Vac is applied and the full-wave rectifier circuit 21 (described later) to remove noises from the commercial power supply to the AC-DC converter 10a. In an embodiment of the present disclosure, it is assumed that a current at the node N1, N2 to which the AC voltage Vac is applied is an input current Iin. The AC voltage Vac herein is a voltage of 100 to 240 V with a frequency of 50 to 60 Hz, for example.

The full-wave rectifier circuit 21 full-wave rectifies a predetermined AC voltage Vac obtained by removing noises therefrom and then applies the rectified voltage Vrec to the capacitor 22 and a main coil L1 of the transformer 23.

Note that the rectified voltage Vrec is directly applied to the main coil L1, however, for example, the rectified voltage Vrec may be applied to the main coil L1 through an element such as a resistor (not illustrated) and/or the like. Further, in an embodiment of the present disclosure, the term "apply" includes not only to directly supply a voltage to a predetermined node but also to indirectly supply a voltage through an element such as a resistor (not illustrated) and/or the like and to supply a divided voltage.

The capacitor 22 is an element that smooths the rectified voltage Vrec, and the transformer 23 includes the main coil L1 and an auxiliary coil L2 magnetically coupled to the main coil L1. In an embodiment of the present disclosure, the auxiliary coil L2 is wound such that the polarity of a voltage generated in the auxiliary coil L2 is opposite to that of a voltage generated in the main coil L1. A voltage Vzcd generated in the auxiliary coil L2 is applied to a terminal ZCD of the power factor correction IC 26 (described later).

The main coil L1 configures a boost chopper circuit with the diode 24, the capacitor 25, and the NMOS transistor 27. Thus, a charge voltage of the capacitor 25 is the DC output voltage Vout. Note that the output voltage Vout is 400 V, for example.

The power factor correction IC 26 is an integrated circuit that controls switching of the NMOS transistor 27 such that the level of the output voltage Vout achieves a target level (for example, 400 V) while improving the power factor of the AC-DC converter 10a. Specifically, the power factor correction IC 26 drives the NMOS transistor 27 based on an inductor current IL flowing through the main coil L1 and the output voltage Vout.

Although details will be described later, the power factor correction IC 26 includes terminals FB, ZCD, COMP, OUT, and VH. The power factor correction IC 26 includes terminals other than the above-described five terminals FB, ZCD, COMP, OUT, and VH, however, other terminals are omitted herein for the sake of convenience.

The NMOS transistor 27 is a transistor that controls power to the load 11 of the AC-DC converter 10a. Note that, in an embodiment of the present disclosure, the NMOS transistor 27 is a metal oxide semiconductor (MOS) transistor, however, it is not limited thereto. As long as it is a transistor capable of controlling power, the NMOS transistor 27 may be a bipolar transistor, for example. A gate electrode of the NMOS transistor 27 is coupled so as to be driven by a signal from the terminal OUT.

The resistors 30 and 31 configure a voltage divider circuit that divides the output voltage Vout to generate a feedback voltage Vfb that is used in switching the NMOS transistor 27. The feedback voltage Vfb generated at a node at which the resistors 30 and 31 are coupled is applied to the terminal FB.

The resistor 32 and the capacitors 33 and 34 are elements for phase compensation of the power factor correction IC 26, which is feedback-controlled. The resistor 32 and the capacitor 33 are provided in series between the terminal COMP and the ground, and the capacitor 34 is provided in parallel with the resistor 32 and the capacitor 33.

The diodes 28 and 29 configure a full-wave rectifier circuit and are coupled to a stage preceding the full-wave rectifier circuit 21 to apply a voltage Vh corresponding to the AC voltage Vac to the terminal VH of the power factor correction IC 26. The voltage Vh is obtained by rectifying the AC voltage Vac obtained from nodes in the stage preceding the full-wave rectifier circuit 21. This makes it possible to detect a phase angle of the voltage Vh more accurately without being affected by the capacitor 22. Specifically, the anode of the diode 28 is coupled to the line on the non-ground side in the stage preceding the full-wave rectifier circuit 21. The anode of the diode 29 is coupled to the line on the ground side in the stage preceding the full-wave rectifier circuit 21. The cathodes of the diodes 28 and 29 are coupled to each other and coupled to the terminal VH of the power factor correction IC 26. A divided voltage obtained by dividing the voltage at the cathodes of the diodes 28 and 29 may be applied to the terminal VH of the power factor correction IC 26.

<<<Operation of AC-DC Converter 10a>>>

Hereinafter, an operation of the AC-DC converter 10a will be described with an operation of the power factor correction IC 26, and how the power factor correction IC 26 improves the power factor of the AC-DC converter 10a will be described.

First, when the AC voltage Vac is applied to the nodes N1 and N2, the AC voltage Vac is applied to the full-wave rectifier circuit 21 through the input line filter 20. The full-wave rectifier circuit 21 full-wave rectifies the AC voltage Vac and outputs the rectified voltage Vrec. The capacitor 22 smooths the rectified voltage Vrec, and the smoothed rectified voltage Vrec is applied to the main coil L1.

Next, when the inductor current IL flowing through the main coil L1 becomes substantially zero, the power factor correction IC 26 turns on the NMOS transistor 27. In this process, the inductor current IL flows to the ground through the NMOS transistor 27.

Then, when a period of time corresponding to the feedback voltage Vfb has elapsed, the power factor correction IC 26 turns off the NMOS transistor 27. At this time, the main coil L1 stores energy to keep passing the inductor current IL that has been passed while the NMOS transistor has been on.

Based on this energy, when the voltage at the anode of the diode 24 exceeds the voltage Vout generated across the capacitor 25 by an amount corresponding to the forward voltage Vf, the main coil L1 passes a current corresponding to the inductor current IL through the diode 24 to charge the capacitor 25. Then, the voltage generated across the capacitor 25 serves as the output voltage Vout.

In addition, when the main coil L1 releases the energy, and the inductor current IL becomes substantially zero, the power factor correction IC 26 turns on the NMOS transistor 27 again. Thus, when the inductor current IL becomes substantially zero, the power factor correction IC 26 turns on the NMOS transistor 27, and when the period of time corresponding to the feedback voltage Vfb has elapsed, the power factor correction IC 26 turns off the NMOS transistor 27. Thereafter, the power factor correction IC 26 continues turning on and off the NMOS transistor 27.

With such an operation, the power factor correction IC 26 shapes the waveform of the average value of the inductor current IL (i.e., the input current Iin) so as to be similar to the waveform of the AC voltage Vac, thereby improving the power factor of the AC-DC converter 10a.

However, when a difference between an absolute value of the AC voltage Vac and a voltage value of the voltage of the capacitor 22 is smaller than the forward voltage Vf of the diodes (not illustrated) in the diode bridge configuring the full-wave rectifier circuit 21, no current flows through the diodes (not illustrated).

That is, the current for charging the capacitor 22 does not flow in the vicinity of a range in which the absolute value of the AC voltage Vac is small, resulting in no input current Iin flowing (hereinafter, this phenomenon is referred to as "dead angle"). In this case, the waveform of the input current Iin does not become similar to the waveform of the AC voltage Vac, and this causes degradation in the power factor and total harmonic distortion (hereinafter, referred to as "THD"). Note that the phrase "the absolute value of the AC voltage Vac is small" means that the level of the AC voltage Vac is low in the case where the level of the AC voltage Vac is positive.

Thus, in order to discharge the capacitor 22 and to reduce the voltage value of the voltage of the capacitor 22 in the vicinity of the range in which the absolute value of the AC voltage Vac is small, the inductor current IL needs to be passed therein. The power factor correction IC 26, which will be described later, is capable of improving the power factor and the like of the AC-DC converter 10a and the like, by passing a large amount of the inductor current IL in the vicinity of the range in which the absolute value of the AC voltage Vac is small to avoid the dead angle. Note that the capacitor 22 corresponds to a "first capacitor", and the main coil L1 corresponds to an "inductor". The current flowing through the main coil L1 is an "inductor current".

=====Configuration of Power Factor Correction IC 26a=====

Figure 2:
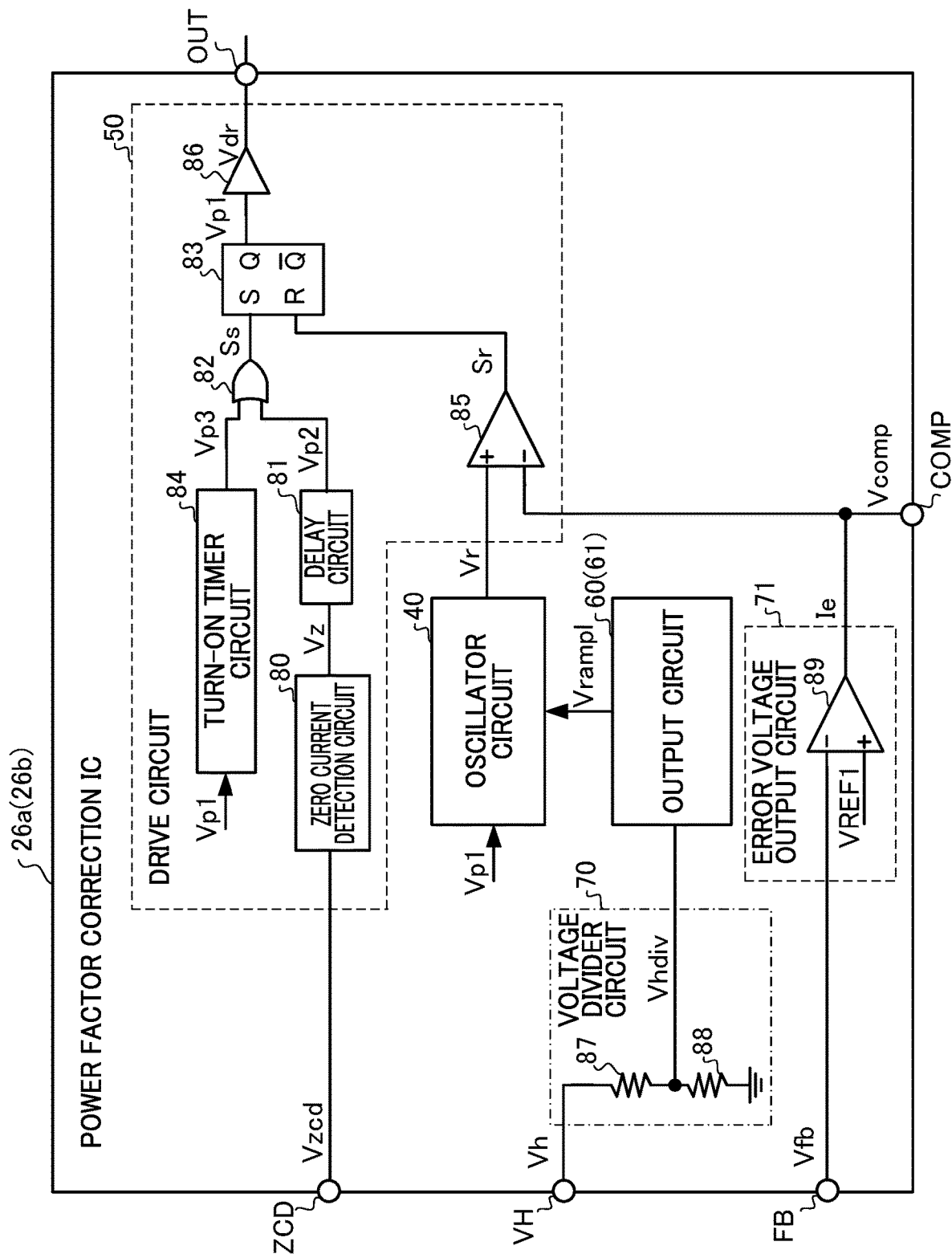

FIG. 2 is a diagram illustrating an example of a power factor correction IC 26a, which is a first embodiment of the power factor correction IC 26. The power factor correction IC 26a includes an oscillator circuit 40, a drive circuit 50, an output circuit 60, a voltage divider circuit 70, and an error voltage output circuit 71. Although terminals in FIG. 2 are illustrated at positions different from the positions in FIG. 1 for the sake of convenience, wiring, elements, and the like coupled to the terminals are the same between FIGS. 1 and 2.

The oscillator circuit 40 generates an oscillator voltage Vr that is needed to turn on and off the NMOS transistor 27. Specifically, upon the inductor current IL becoming smaller than substantially zero and a drive signal Vp1 at a high level (hereinafter, referred to as high or high level) is received, the oscillator circuit 40 outputs the oscillator voltage Vr that gradually increase in amplitude with a predetermined slope from a bias voltage Vramp1 (described later) outputted by the output circuit 60 (described later). Details of the oscillator circuit 40 will be described later.

The drive circuit 50 outputs a drive signal Vdr to drive the NMOS transistor 27. Specifically, upon the inductor current IL becoming smaller than substantially zero, the drive circuit 50 turns on the NMOS transistor 27, and upon the oscillator voltage Vr reaching a voltage corresponding to the feedback voltage Vfb, the drive circuit 50 turns off the NMOS transistor 27. The drive circuit 50 includes a zero current detection circuit 80, a delay circuit 81, an OR circuit 82, an SR flip-flop 83, a turn-on timer circuit 84, a comparator 85, and a buffer 86.

The zero current detection circuit 80 detects whether a current value of the inductor current IL is a "current value Ia" indicating substantially zero (hereinafter, "substantially zero" is simply referred to as zero for the sake of convenience) based on the voltage Vzcd at the terminal ZCD. Upon detecting that the current value of the inductor current IL is the "current value Ia" indicating "zero", the zero current detection circuit 80 according to an embodiment of the present disclosure outputs a high signal Vz. The zero current detection circuit 80 includes a comparator (not illustrated) that compares a predetermined voltage of the auxiliary coil L2 at the time when the inductor current IL reaches the "current value Ia" with the voltage Vzcd.

Upon receiving the high signal Vz outputted from the zero current detection circuit 80, the delay circuit 81 delays the received signal for a predetermined period of time and outputs a pulse signal Vp2.

The OR circuit 82 calculates and outputs the logical sum of the pulse signal Vp2 and a pulse signal Vp3. Specifically, upon receiving the high pulse signal Vp2 outputted by the delay circuit 81, or upon receiving the high pulse signal Vp3 outputted by the turn-on timer circuit 84 (described later), the OR circuit 82 outputs a high setting signal Ss. Thus, in an embodiment of the present disclosure, the OR circuit 82 outputs the pulse signal Vp2 or the pulse signal Vp3 as the setting signal Ss.

Upon receiving the high setting signal Ss outputted by the OR circuit, the SR flip-flop 83 outputs the high drive signal Vp1. Meanwhile, upon receiving a high reset signal Sr outputted by the comparator 85 (described later), the SR flip-flop 83 outputs the drive signal Vp1 at a low level (hereinafter, referred to as low or low level).

The turn-on timer circuit 84 outputs the pulse signal Vp3 for turning on the NMOS transistor 27, upon activation of the power factor correction IC 26a or when no AC voltage Vac is supplied and the pulse signal Vp2 is not received. Specifically, when the pulse signal Vp2 is not received for a predetermined period of time, the high pulse signal Vp3 is outputted in each predetermined cycle.

The comparator 85 is a circuit that compares the voltage Vcomp that is outputted by the error voltage output circuit 71 (described later) according to the feedback voltage Vfb with the oscillator voltage Vr. Specifically, the voltage Vcomp is applied to an inverting input terminal of the comparator 85, and the oscillator voltage Vr is applied to a non-inverting input terminal of the comparator 85. Thus, when the level of the oscillator voltage Vr is lower than the level of the voltage Vcomp, the comparator 85 outputs the low reset signal Sr, and when the level of the oscillator voltage Vr is higher than the level of the voltage Vcomp, the comparator 85 outputs the high reset signal Sr.

The buffer 86 is a circuit that drives the NMOS transistor 27 in response to the drive signal Vp1. Specifically, the buffer 86 drives the NMOS transistor 27 having a large gate capacitance and the like using the signal Vdr at the same logic level as that of the received signal. The buffer 86 turns on the NMOS transistor 27 in response to the high drive signal Vp1 and turns off the NMOS transistor 27 in response to the low drive signal Vp1.

The output circuit 60 outputs the bias voltage Vramp1 to the oscillator circuit 40. Specifically, the output circuit 60 outputs the bias voltage Vramp1 based on a divided voltage Vhdiv outputted by the voltage divider circuit 70 (described later) such that the on-time of the NMOS transistor 27 decreases when the level of the divided voltage Vhdiv increases, and details thereof will be described later.

Figure 3:
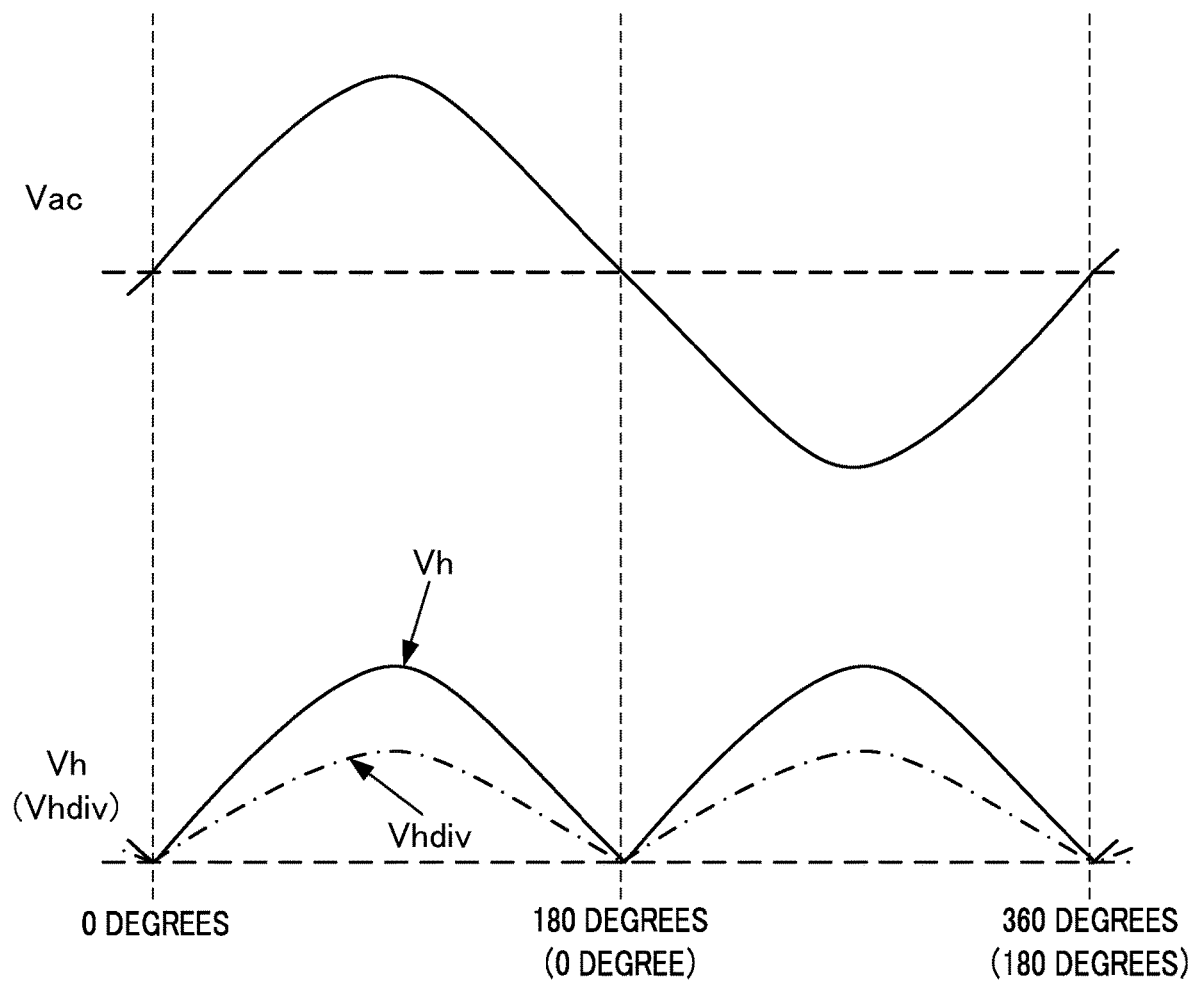
FIG. 3 is a diagram illustrating a relationship between an alternating-current (AC) voltage Vac, a rectified voltage Vh, and a divided voltage Vhdiv.

The voltage divider circuit 70 generates the divided voltage Vhdiv that is obtained by dividing the voltage Vh obtained by full-wave rectifying the AC voltage Vac, and the voltage divider circuit 70 will be described below with reference to FIG. 3. FIG. 3 herein is a diagram illustrating a relationship between the AC voltage Vac, the voltage Vh obtained by full-wave rectifying the AC voltage Vac, and the divided voltage Vhdiv generated by the voltage divider circuit 70.

The voltage divider circuit 70 includes resistors 87 and 88. Specifically, the resistor 87 has one end coupled to the terminal VH, and the other end coupled in series with one end of the resistor 88. The other end of the resistor 88 is grounded. Consequently, the voltage Vhdiv is generated at the node at which the resistors 87 and 88 are coupled.

The voltage level of the AC voltage Vac changes periodically according to the phase angle, and the voltage levels of the voltage Vh and the divided voltage Vhdiv also change periodically according to the phase angle similarly. Specifically, the level of the AC voltage Vac rises when the phase angle changes from 0 degrees to 90 degrees, and drops when the phase angle changes from 90 degrees to 270 degrees. The level of the AC voltage Vac rises when the phase angle changes from 270 degrees to 360 degrees. Meanwhile, the level of the voltage Vh rises when the phase angle changes from 0 degrees to 90 degrees, and drops when the phase angle changes from 90 degrees to 180 degrees. The level of the voltage Vh similarly changes when the phase angle changes from 180 degrees to 360 degrees. Since the divided voltage Vhdiv is a voltage obtained by dividing the voltage Vh, the divided voltage Vhdiv changes periodically according to the phase angle as the voltage Vh does.

Although an example in which the voltage divider circuit 70 is provided inside the power factor correction IC 26a has been described, the voltage divider circuit may be provided outside the power factor correction IC 26a such that the AC voltage Vac is rectified by the diodes 28 and 29, and the voltage obtained by dividing the rectified voltage using the voltage divider circuit is applied to the terminal VH. Further, although the description has been given assuming that the resistors in the voltage divider circuit 70 are the resistors 87 and 88, the configuration is not limited thereto, and any number of resistors may be combined.

Returning to FIG. 2, the error voltage output circuit 71 will be described. The error voltage output circuit 71 is a transconductance amplifier 89. The transconductance amplifier 89 generates an error current Ie corresponding to an error between the feedback voltage Vfb and a reference voltage VREF1 corresponding to the output voltage Vout at the target level, charges the capacitors 33 and 34 through the terminal COMP, and generates the voltage Vcomp. Then, the error voltage output circuit 71 outputs the voltage Vcomp. Note that the voltage Vcomp corresponds to an "error voltage", and the "current value Ia" corresponds to a "first predetermined value".

<<<Example of Oscillator Circuit 40 and Output Circuit 60>>>

Figure 4:
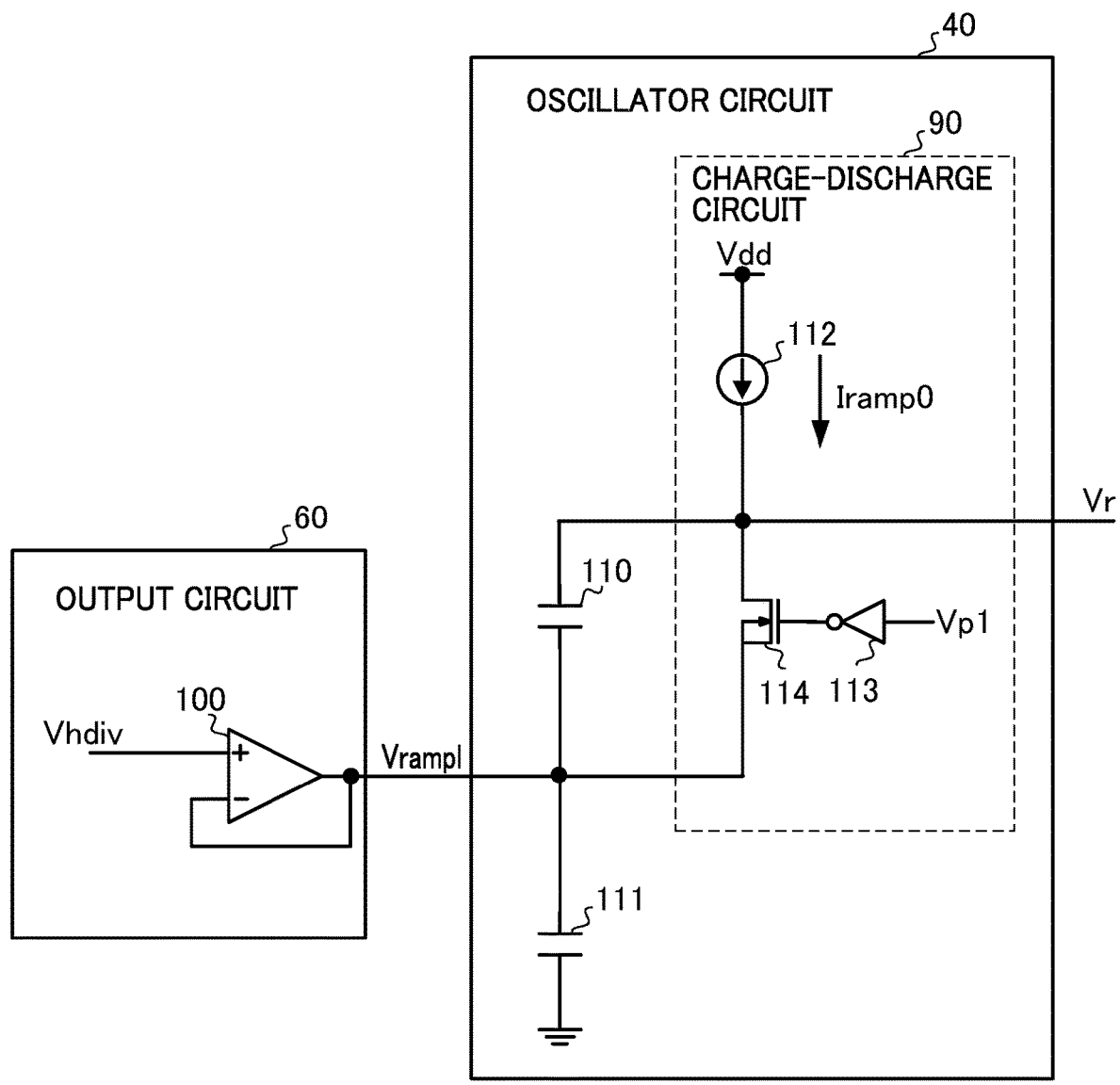
FIG. 4 is a diagram illustrating an example of an oscillator circuit 40 and an output circuit 60.

FIG. 4 is a diagram illustrating an example of the oscillator circuit 40 and the output circuit 60. The output circuit 60 is a buffer circuit 100 that outputs the divided voltage Vhdiv to the oscillator circuit 40 as the bias voltage Vramp1.

The oscillator circuit 40 outputs the oscillator voltage Vr, and includes capacitors 110 and 111 and a charge-discharge circuit 90. The charge-discharge circuit 90 generates the oscillator voltage Vr with a predetermined slope by charging and discharging the capacitor 110, and includes a constant current source 112 that outputs a constant current Iramp0, an inverter 113, and an NMOS transistor 114.

When the inductor current IL reaches substantially zero and the high drive signal Vp1 is received, the NMOS transistor 114 is turned off, and the capacitor 110 is charged with the constant current Iramp0 from the constant current source 112. The capacitor 111 is charged so as to hold the bias voltage Vramp1 outputted from the output circuit 60.

Thus, the oscillator voltage Vr results in being a voltage obtained by adding the voltage of the capacitor 110 to the voltage of the capacitor 111 (i.e., the bias voltage Vramp1). Upon the high drive signal Vp1 being inputted, the voltage of the capacitor 110 gradually rises with a predetermined slope, thereby causing the oscillator voltage Vr to gradually rise from the bias voltage Vramp1 with a predetermined slope.

On the other hand, upon the low drive signal Vp1 being inputted, the NMOS transistor 114 is turned on, and the capacitor 110 is discharged. In this process, the charges stored in the capacitor 110 are drawn to the ground through a transistor (not illustrated) in the output stage of the buffer circuit 100, the NMOS transistor 114, and the like. With the capacitor 110 being discharged, the oscillator voltage Vr results in being the bias voltage Vramp1. Note that the capacitor 110 corresponds to a "second capacitor".

<<<Operation of Power Factor Correction IC 26a>>>

Figure 5:
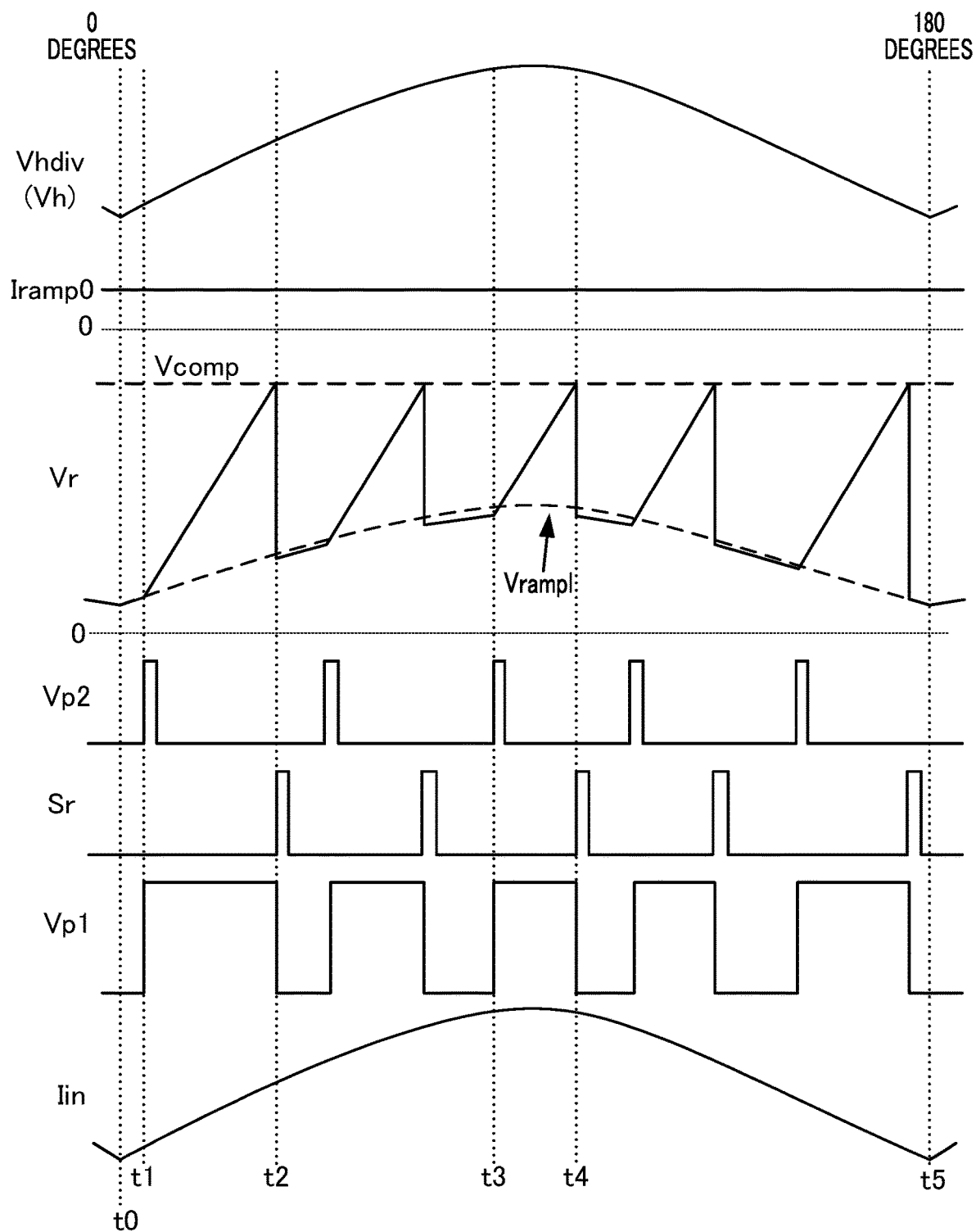

FIG. 5 is a diagram illustrating an operation of the power factor correction IC 26a. At time t0, the phase angle of the voltage Vh obtained by full-wave rectifying the AC voltage Vac is 0 degrees, and the divided voltage Vhdiv obtained by dividing the voltage Vh has the lowest level. Then, the output circuit 60 outputs the divided voltage Vhdiv as the bias voltage Vramp1. Thus, the bias voltage Vramp1 starts rising with a rise in the divided voltage Vhdiv.

At time t1, when the inductor current IL becomes smaller than substantially zero, the delay circuit 81 outputs the high pulse signal Vp2. Then, the SR flip-flop 83 outputs the high drive signal Vp1, and as a result, the power factor correction IC 26a turns on the NMOS transistor 27. At this time, the bias voltage Vramp1 is higher than that at time t0.

When the NMOS transistor 27 is turned on, the charge-discharge circuit 90 starts charging the capacitor 110 with the constant current Iramp0. Then, the oscillator voltage Vr results in a voltage obtained by adding the bias voltage Vramp1 outputted by the output circuit 60 and the voltage of the capacitor 110. In this process, since the capacitor 110 is charged with the constant current Iramp0, the oscillator voltage Vr gradually rises with a predetermined slope.

When the oscillator voltage Vr reaches the voltage Vcomp at time t2, the comparator 85 outputs the high reset signal Sr. Accordingly, the SR flip-flop 83 outputs the low drive signal Vp1, and as a result, the power factor correction IC 26a turns off the NMOS transistor 27.

When the NMOS transistor 27 is turned off, the charge-discharge circuit 90 discharges the capacitor 110, and the oscillator voltage Vr results in being the bias voltage Vramp1. Then, from time t2 to time t3, the power factor correction IC 26a repeats driving the NMOS transistor similarly. Further, from time t2 to time t3, the bias voltage Vramp1 rises with a rise in the divided voltage Vhdiv. Thus, the on-time of the NMOS transistor 27 gradually decreases.

The power factor correction IC 26a turns on the NMOS transistor 27 at time t3, and the power factor correction IC 26a turns off the NMOS transistor 27 at time t4. The on-time of the NMOS transistor 27 from time t3 to time t4 is shorter than the on-time of the NMOS transistor 27 from time t1 to time t2. This is because the voltage level of the bias voltage Vramp1 (i.e., the divided voltage Vhdiv), which varies with the level of the voltage Vh, is higher in the period of time from time t3 to time t4 than in the period of time from time t1 to time t2.

Accordingly, the power factor correction IC 26a can decrease the on-time of the NMOS transistor 27 when the level of the voltage Vh rises. From time t4 to time t5, the power factor correction IC 26a repeats driving the NMOS transistor similarly. From time t4 to time t5, the bias voltage Vramp1 drops with a drop in the divided voltage Vhdiv. Thus, at time t4 and thereafter, the on-time of the NMOS transistor 27 gradually increases.

At time t5, the phase angle of the voltage Vh obtained by full-wave rectifying the AC voltage Vac is 180 degrees, and the divided voltage Vhdiv obtained by dividing the voltage Vh has the lowest level. Note that the bias voltage Vramp1 corresponds to a "first voltage", and the voltage Vcomp corresponds to a "second voltage".

It is understood from the operation described above that, in the power factor correction IC 26a, the on-time of the NMOS transistor 27 is longer in the vicinity of a range in which the level of the voltage Vh is low, that is, in which the absolute value of the AC voltage Vac is small. Thus, in the power factor correction IC 26a, a large amount of the inductor current IL can be passed in the vicinity of the range in which the absolute value of the AC voltage Vac is small, that is, in a low phase angle region, thereby being able to reduce the dead angle. Consequently, the power factor correction IC 26a can improve the power factor and the THD. In addition, with the output circuit 60 changing the bias voltage Vramp1, it is possible to change the on-time of the NMOS transistor 27 regardless of the effect of a noise component of the voltage Vcomp caused by switching noises and the like of the NMOS transistor 27.

Note that FIG. 5 illustrates only several pulses of the drive signal Vp1 to help understanding of the operation of the power factor correction IC 26a according to an embodiment of the present disclosure in FIG. 2. However, the NMOS transistor 27 has a switching frequency of several kHz, for example, which is sufficiently higher than the frequency of the AC voltage Vac of 50 to 60 Hz. Thus, in actuality, a numerous number of drive signals Vp1 are included in the time period of one cycle of the AC voltage Vac.

=====Configuration of Power Factor Correction IC 26b=====

A power factor correction IC 26b, which is a second embodiment of the power factor correction IC 26, is different from the power factor correction IC 26a in that an output circuit 61 is used as the output circuit. Note that parts or elements that are similar to those in the power factor correction IC 26a in FIG. 2 are given the same reference numerals.

<<<Configuration of Output Circuit 61>>>

Figure 6:
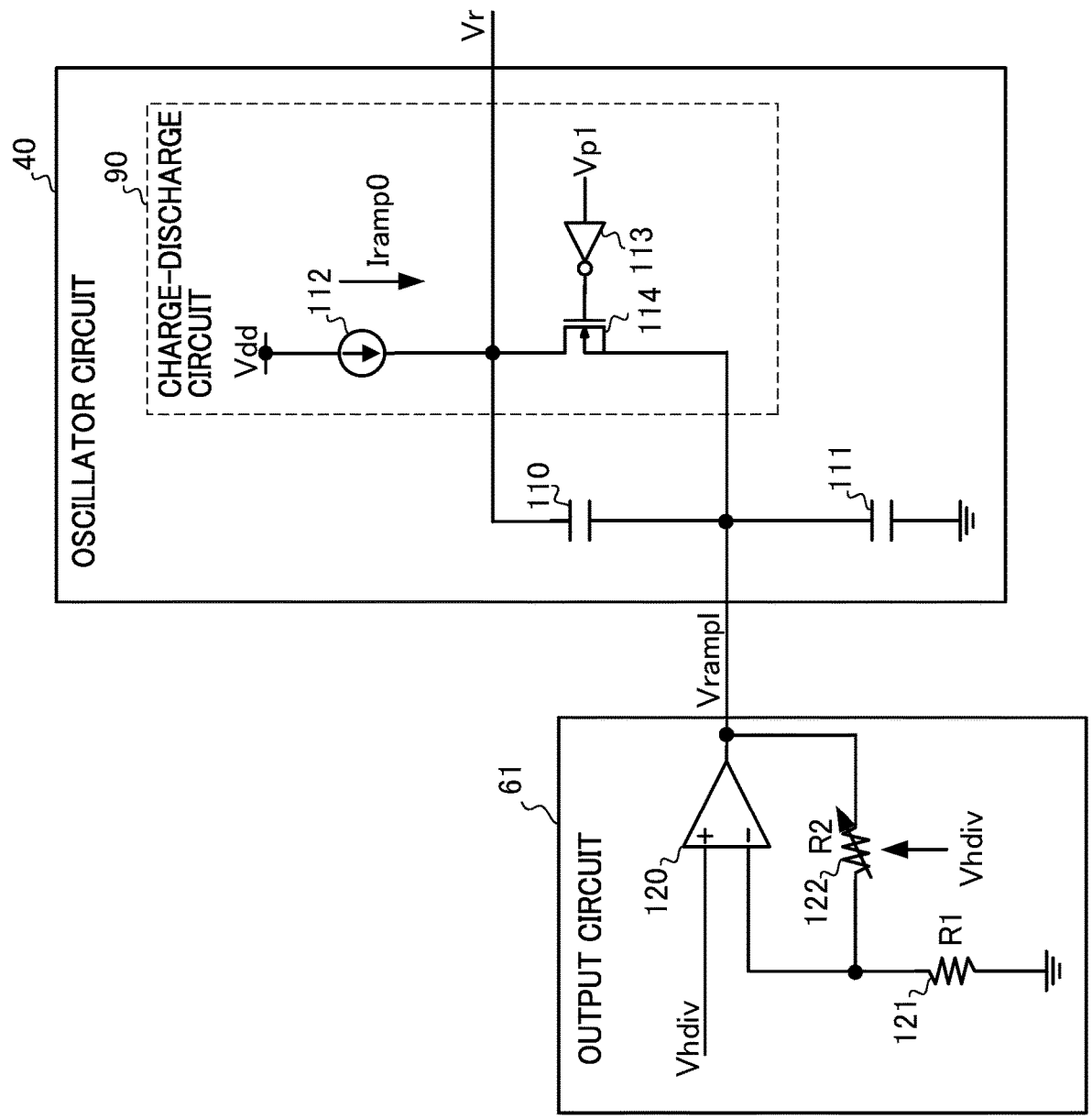
FIG. 6 is a diagram illustrating an example of an oscillator circuit 40 and an output circuit 61.
Figure 7:
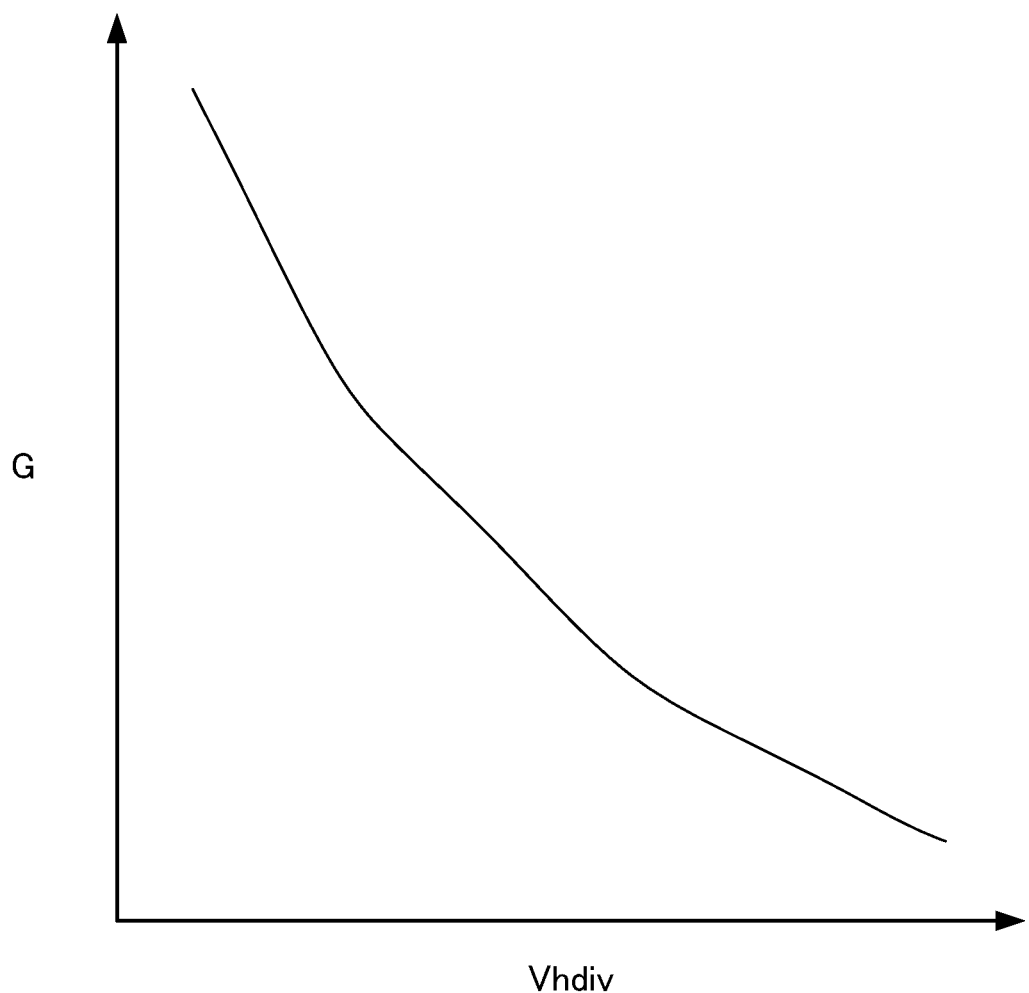
FIG. 7 is a diagram illustrating a relationship between a divided voltage Vhdiv and a gain G of an output circuit 61.

FIG. 6 is a diagram illustrating an example of the oscillator circuit 40 and the output circuit 61. The output circuit 61 is an amplifier circuit that amplifies the divided voltage Vhdiv by a gain G corresponding to the level of the divided voltage Vhdiv, and outputs the amplified divided voltage Vhdiv as the bias voltage Vramp1. Specifically, when the level of the divided voltage Vhdiv rises, the output circuit 61 reduces the gain G and reduces a rise in the bias voltage Vramp1 as illustrated in FIG. 7.

The output circuit 61 includes an operational amplifier 120, a resistor 121, and a variable resistor 122. The divided voltage Vhdiv and the bias voltage Vramp1 have a relationship given by the following expressions.

$$Vramp1 = (R1 + R2)/R1 \times Vhdiv \qquad (1)$$

$$= G \times Vhdiv, \qquad (2)$$

where a resistance value R1 is a resistance value of the resistor 121, and a resistance value R2 is a resistance value of the variable resistor 122. The output circuit 61 is configured such that, when the level of the divided voltage Vhidv rises, the resistance value R2 decreases, and the gain G of the output circuit 61 decreases.

Accordingly, in the power factor correction IC 26b, since a large amount of the inductor current IL can flow in the vicinity of the range in which the absolute value of the AC voltage Vac is small, that is, in the low phase angle region, thereby being able to reduce the dead angle. Consequently, the power factor correction IC 26b can improve the power factor and the THD.

<<<Operation of Power Factor Correction IC 26a in Case of Heavy Load>>>

Figure 8:
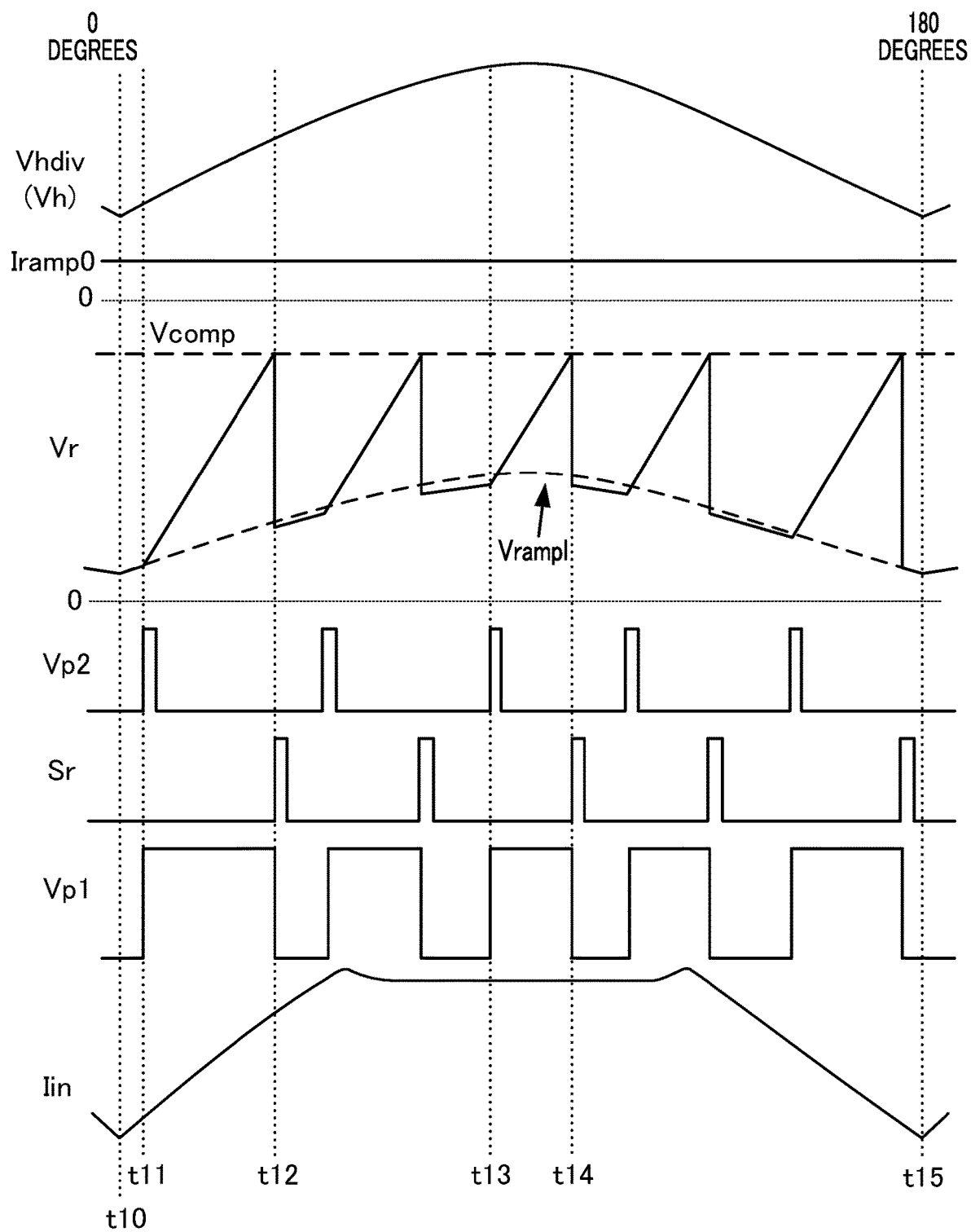
FIG. 8 is a diagram illustrating an operation of a power factor correction IC 26a when a load 11 is a heavy load.

FIG. 8 is a diagram illustrating an operation of the power factor correction IC 26a when the load 11 is a heavy load. Here, the state in which the load 11 is a "heavy load" means a state in which the power consumption of the load 11 increases, and the input current Iin of the AC-DC converter 10a increases, as compared to the state in which the load 11 is a "light load". Note that, in an embodiment of the present disclosure, the "heavy load" means that the current flowing through the load 11 is equal to or greater than a predetermined current value (for example, 5 A), and the "light load" means that the current flowing through the load 11 is smaller than the predetermined current value, for example.

In FIG. 8, the power factor correction IC 26a drives the NMOS transistor 27 as in the case of FIG. 5, and time t10 to time t15 in FIG. 8 corresponds to time t0 to time t5 in FIG. 5. However, since the load 11 is a "heavy load", the input current Iin flows more than in FIG. 5. The power factor correction IC 26a passes a large amount of the inductor current IL and increases the on-time of the NMOS transistor 27 in the vicinity of the range in which the absolute value of the AC voltage Vac is small. On the other hand, the power factor correction IC 26a decreases the on-time of the NMOS transistor 27 in the vicinity of a range in which the absolute value of the AC voltage Vac is large. Accordingly, when the load 11 is a "heavy load", the power factor correction IC 26a cannot sufficiently pass the inductor current IL in the vicinity of the range in which the absolute value of the AC voltage Vac is large. Consequently, the power factor correction IC 26a becomes unable to shape the waveform of the average value of the inductor current IL (i.e., the input current Iin) so as to be similar to the waveform of the AC voltage Vac.

Thus, descriptions will be given below of embodiments of power factor correction ICs 26c and 26d that can shape the waveform of the average value of the inductor current IL (i.e., the input current Iin) so as to be similar to the waveform of the AC voltage Vac even when the load 11 is a "heavy load".

=====Configuration of Power Factor Correction IC 26c=====

Figure 9:
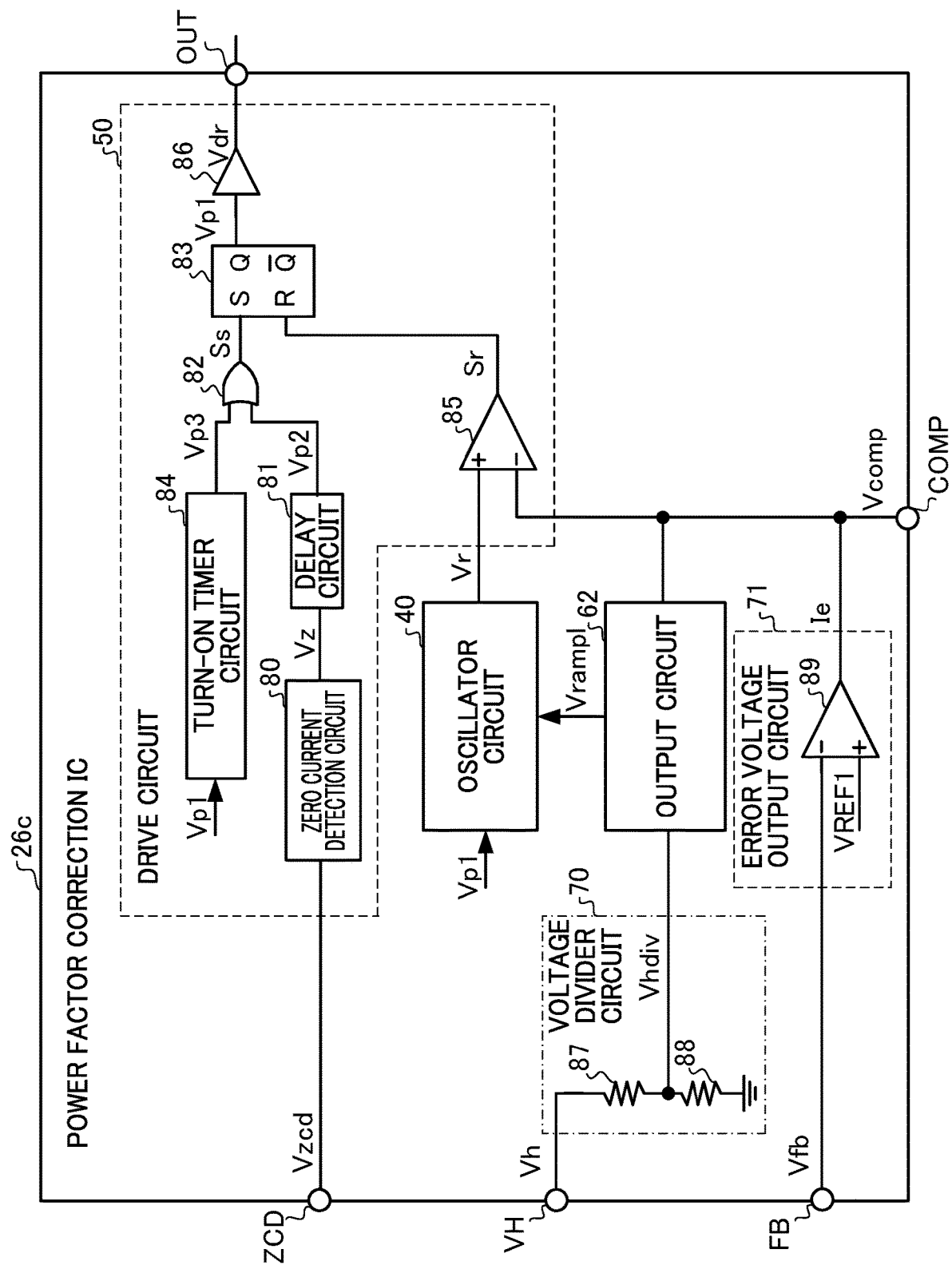
FIG. 9 is a diagram illustrating an example of a power factor correction IC 26c.

FIG. 9 is a diagram illustrating an example of the power factor correction IC 26c. The power factor correction IC 26c, which is a third embodiment of the power factor correction IC 26, is different from the power factor correction IC 26a in that an output circuit 62 is used as the output circuit. Note that parts or elements that are similar to those in the power factor correction IC 26a in FIG. 2 are given the same reference numerals.

<<<Configuration of Output Circuit 62>>>

Figure 10:
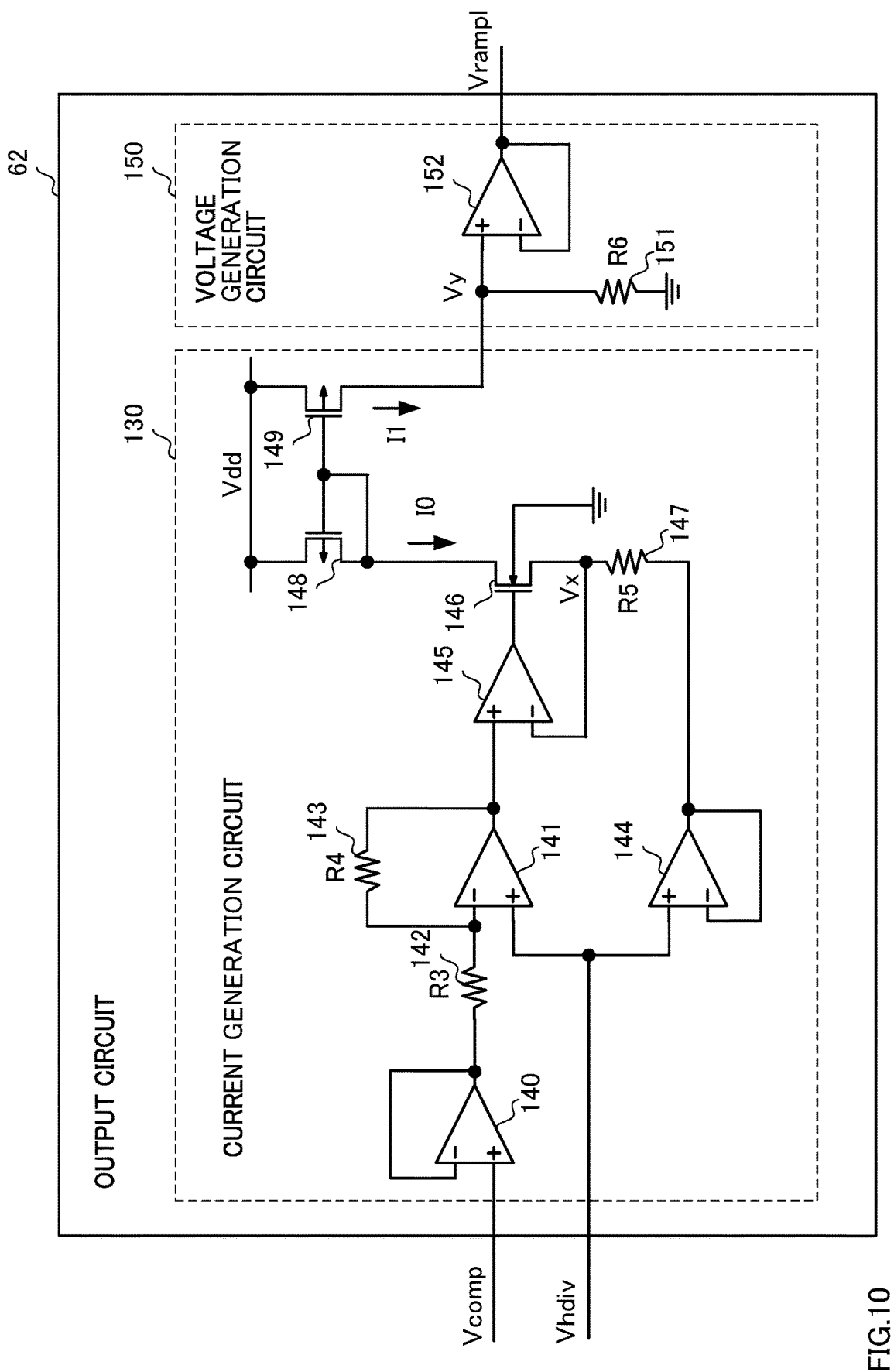
FIG. 10 is a diagram illustrating an example of an output circuit 62.

FIG. 10 is a diagram illustrating an example of the output circuit 62. The output circuit 62 outputs a voltage corresponding to a difference between the divided voltage Vhdiv and the voltage Vcomp to the oscillator circuit 40 as the bias voltage Vramp1. Specifically, the output circuit 62 changes the bias voltage Vramp1 based on the divided voltage Vhdiv and the voltage Vcomp, and outputs the changed bias voltage Vramp1 so as to decrease the on-time of the NMOS transistor 27 when the level of the divided voltage Vhdiv increases. Also, the output circuit 62 changes the bias voltage Vramp1 based on the divided voltage Vhdiv and the voltage Vcomp, and outputs the changed bias voltage Vramp1 so as to increase the on-time of the NMOS transistor 27 when the feedback voltage Vfb decreases. The output circuit 62 includes a current generation circuit 130 and a voltage generation circuit 150.

The current generation circuit 130 generates the current I1 based on the difference between the divided voltage Vhdiv and the voltage Vcomp. The current generation circuit 130 includes operational amplifiers 140, 141, 144, and 145, resistors 142, 143, and 147, an NMOS transistor 146, and p-type metal-oxide-semiconductor (PMOS) transistors 148 and 149.

The operational amplifier 140 configures a buffer circuit that outputs the voltage Vcomp, and the operational amplifier 144 configures a buffer circuit that outputs the divided voltage Vhdiv.

The operational amplifier 141 and the resistors 142 and 143 configure a differential amplifier circuit that amplifies the difference between the divided voltage Vhdiv and the voltage Vcomp. Assuming that a voltage Vx is an output voltage of the operational amplifier 141, the voltage Vx is given by the following expression.

$$Vx=(R3+R4)/R3 \times (Vhdiv-R4/(R3+R4) \times Vcomp) \qquad (3),$$

where a resistance value R3 is a resistance value of the resistor 142, and a resistance value R4 is a resistance value of the resistor 143.

The operational amplifier 145 is a circuit that controls a current I0 flowing through the NMOS transistor 146 such that a voltage that is obtained by adding a voltage generated in the resistor 147 with the current I0 being passed therethrough and the divided voltage Vhdiv, reaches the voltage Vx. Accordingly, the current IC is given by the following expression.

$$I0=(Vx-Vhdiv)/R5 \qquad (4),$$

where a resistance value R5 is a resistance value of the resistor 147.

When the voltage Vx of the expression (3) is substituted into the expression (4), the current I0 is given by the following expression.

$$I0=(Vhdiv-Vcomp) \times R4/R3/R5 \qquad (5)$$

The PMOS transistors 148 and 149 configure a current mirror circuit that outputs the current I1 corresponding to the current IC. A ratio K0 of the currents I0 and I1 is a ratio determined based on a ratio of the sizes of the PMOS transistors 148 and 149. The current I1 is given by the following expression using the current I0.

$$I1 = K0 \times I0 \qquad (6)$$
$$= K0 \times (Vhdiv - Vcomp) \times R4/R3/R5$$

The voltage generation circuit 150 is a buffer circuit that outputs, as the bias voltage Vramp1, a voltage generated with the current I1 being passed through a resistor 151. The voltage generation circuit 150 includes the resistor 151 and an operational amplifier 152.

Assuming that a voltage Vy is generated when the current I1 from the current generation circuit 130 flows through the resistor 151, the voltage Vy is given by the following expression using the expression (6).

$$Vy = R6 \times I1 \qquad (7)$$
$$= K0 \times (Vhdiv - Vcomp) \times R4/R3/R5 \times R6,$$

where a resistance value R6 is a resistance value of the resistor 151.

The operational amplifier 152 configures a buffer circuit that outputs the voltage Vy inputted to a non-inverting input terminal thereof, as the bias voltage Vramp1. Thus, the voltage Vramp1 is equal to the voltage Vy, and the voltage Vramp1 is given by the following expression.

$$Vramp1 = Vy \qquad (8)$$
$$= K0 \times (Vhdiv - Vcmop) \times R4/R3/R5 \times R6.$$

<<<Operation of Power Factor Correction IC 26c>>>

Figure 11:
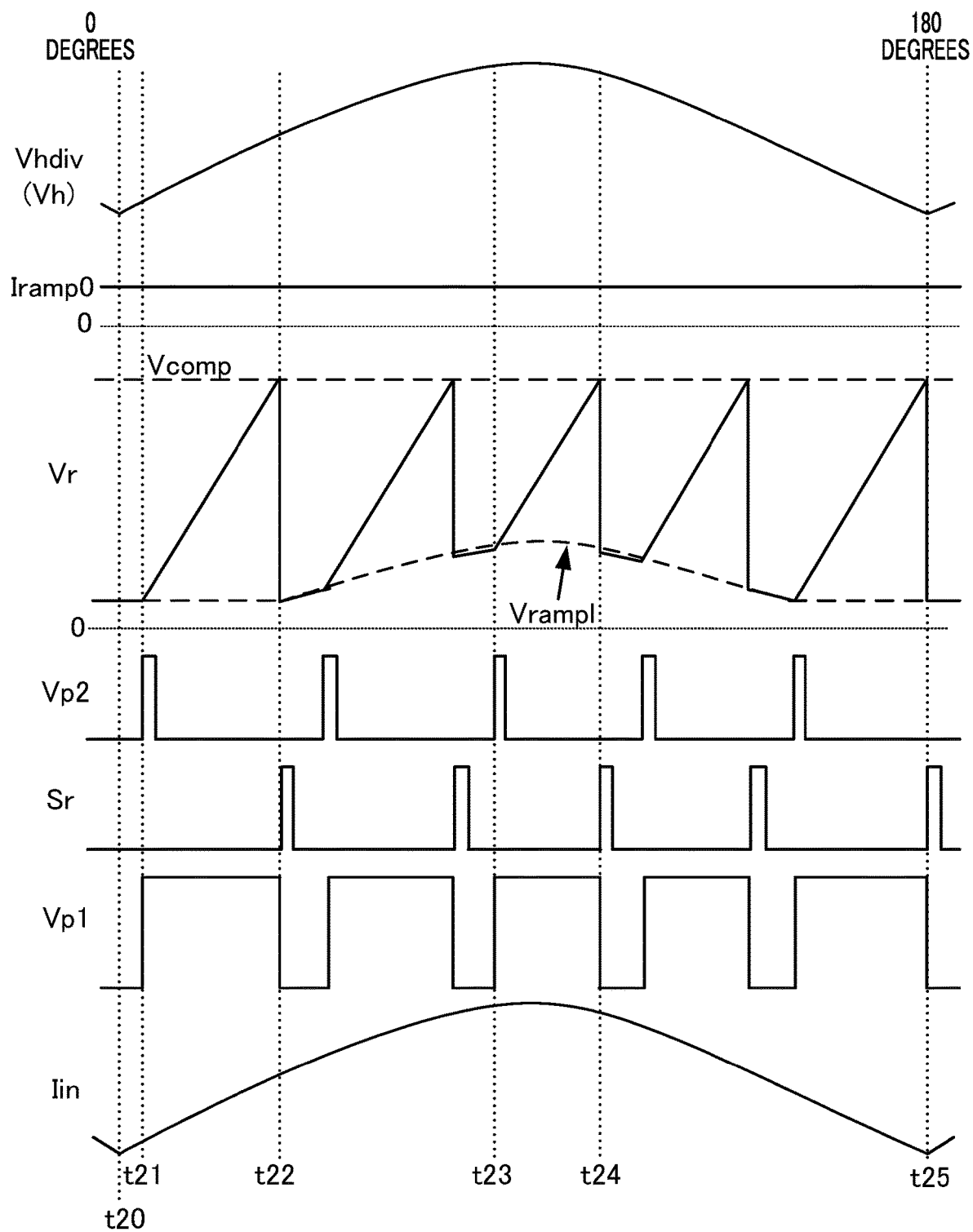
FIG. 11 is a diagram illustrating an operation of a power factor correction IC 26c when a load 11 is a heavy load.

FIG. 11 is a diagram illustrating an operation of the power factor correction IC 26c when the load 11 is a heavy load. At time t20, the phase angle of the voltage Vh obtained by full-wave rectifying the AC voltage Vac is 0 degrees, and the divided voltage Vhdiv obtained by dividing the voltage Vh has the lowest level. The output circuit 62 outputs the bias voltage Vramp1 given by the expression (8).

In an embodiment of the present disclosure, resistance values of the resistors 87 and 88 of the voltage divider circuit 70 herein are set such that the divided voltage Vhdiv becomes smaller than the voltage Vcomp when the phase angle of the divided voltage Vhdiv is a low phase angle. Accordingly, at time t20, the divided voltage Vhdiv is smaller than the voltage Vcomp, and thus the bias voltage Vramp1 is substantially at the ground voltage level, for example.

Upon the inductor current IL becoming smaller than substantially zero at time t21, the power factor correction IC 26c turns on the NMOS transistor 27. Then, the oscillator voltage Vr gradually rises with a predetermined slope. At time t21, the bias voltage Vramp1 is still substantially at the ground voltage level.

When the oscillator voltage Vr exceeds the voltage Vcomp at time t22, the power factor correction IC 26c turns off the NMOS transistor 27. From time t20 to time t22, the bias voltage Vramp1 is at a substantially constant value since the current I1 of the current generation circuit 130 does not flow. Further, from time t22 to time t23, the power factor correction IC 26c repeats driving the NMOS transistor 27 similarly.

The power factor correction IC 26c turns on the NMOS transistor 27 at time t23, and the power factor correction IC 26c turns off the NMOS transistor 27 at time t24. Note that the on-time of the NMOS transistor 27 from time t23 to time t24 is shorter than the on-time of the NMOS transistor 27 from time t21 to time t22. This is because the divided voltage Vhdiv is higher than the voltage Vcomp, and the bias voltage Vramp1 is higher than substantially the ground voltage level from time t23 to time t24. From time t20 to time t23, since the divided voltage Vhdiv rises, the on-time of the NMOS transistor 27 gradually decreases.

However, in the case where the load 11 is a "heavy load", the bias voltage Vramp1 is lower than that in the power factor correction IC 26a. Thus, the input current Iin flows more than that in the power factor correction IC 26a, from time t20 to time t25. From time t24 to time t25, the power factor correction IC 26c repeats driving the NMOS transistor 27 similarly. In addition, from time t24 to time t25, the bias voltage Vramp1 drops with a drop in the divided voltage Vhdiv and then the bias voltage Vramp1 results in substantially the ground voltage level. Accordingly, at and after time t24, the on-time of the NMOS transistor 27 gradually increases.

At time t25, the phase angle of the voltage Vh obtained by full-wave rectifying the AC voltage Vac is 180 degrees, and the divided voltage Vhdiv obtained by dividing the voltage Vh has the lowest level.

It is understood from the above-described operation that, in the power factor correction IC 26c, the bias voltage Vramp1 of the power factor correction IC 26c is lower than the bias voltage Vramp1 of the power factor correction IC 26a in the vicinity of a range in which the level of the voltage Vh is high, that is, in which the absolute value of the AC voltage Vac is large. Thus, the on-time of the NMOS transistor 27 is longer than that in the power factor correction IC 26a. Accordingly, in the power factor correction IC 26c, a large amount of the inductor current IL can be passed in the vicinity of the range in which the absolute value of the AC voltage Vac is large, that is, in a high phase angle region. Thus, the power factor correction IC 26c can shape the waveform of the input current Iin so as to be similar to the waveform of the AC voltage Vac even when the load 11 is a "heavy load". Consequently, the power factor correction IC 26c can improve the power factor and the THD.

Note that FIG. 11 illustrates only several pulses of the drive signal Vp1 to help understanding of the operation of the power factor correction IC 26c according to an embodiment of the present disclosure in FIG. 9. However, the NMOS transistor 27 has a switching frequency of several kHz, for example, which is sufficiently higher than the frequency of the AC voltage Vac of 50 to 60 Hz. Thus, in actuality, a numerous number of drive signals Vp1 are included in the time period of one cycle of the AC voltage Vac.

In an embodiment of the power factor correction IC 26c in FIG. 9, a large amount of the inductor current IL flows in the vicinity of the range in which the absolute value of the AC voltage Vac is large, that is, in the high phase angle region, based on the voltage Vcomp. However, it is also possible to reduce the degradation of the power factor when the load 11 is a "heavy load" by estimating the state of the load 11 based on a measurement value of the inductor current IL at the time when the NMOS transistor 27 is turned on and controlling an AC-DC converter 10b. Thus, by using this method, the power factor correction IC 26d used in the AC-DC converter 10b, which will be described next, shapes the waveform of the average value of the inductor current IL (i.e., the input current Iin) so as to be similar to the waveform of the AC voltage Vac even when the load 11 is a "heavy load".

<<<Configuration of AC-DC converter 10b>>>

Figure 12:
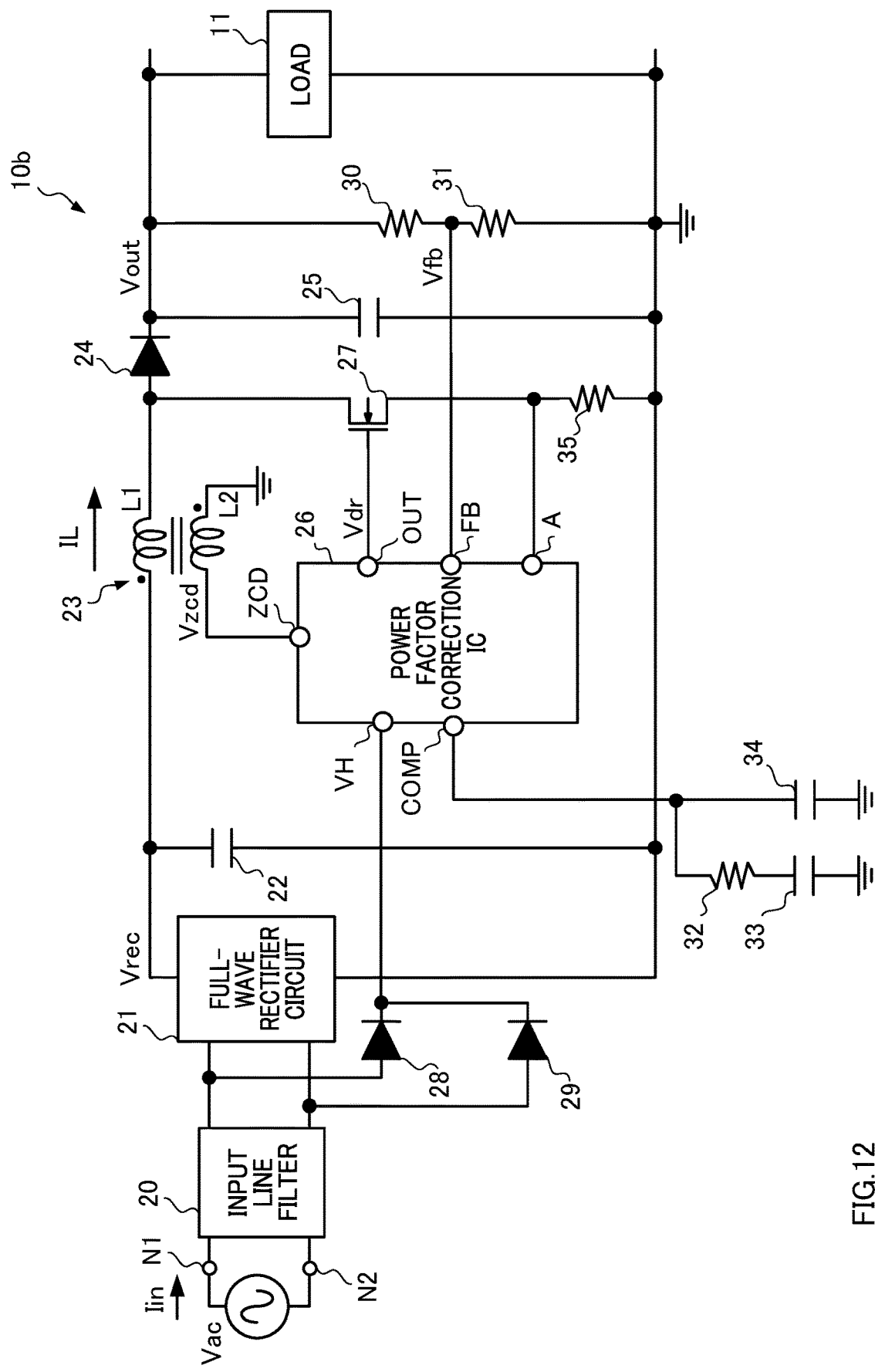
FIG. 12 is a diagram illustrating an example of an AC-DC converter 10b.

FIG. 12 is a diagram illustrating an example of the AC-DC converter 10b. The AC-DC converter 10b is different from the AC-DC converter 10a in including a resistor 35 for measuring the inductor current IL at the time when the NMOS transistor 27 is turned on.

=====Configuration of Power Factor Correction IC 26d=====

Figure 13:
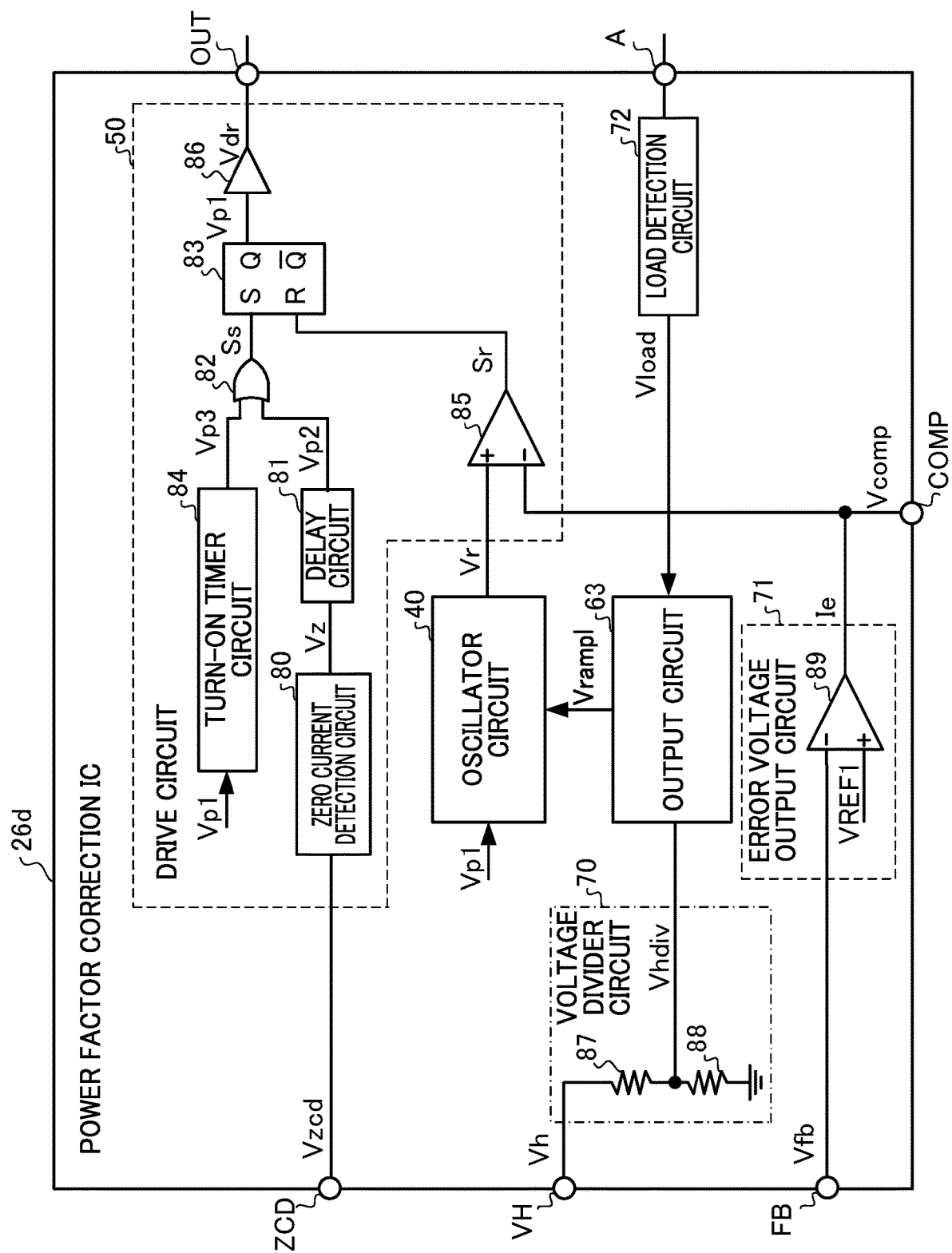
FIG. 13 is a diagram illustrating an example of a power factor correction IC 26d.

FIG. 13 is a diagram illustrating an example of the power factor correction IC 26d. The power factor correction IC 26d, which is a fourth embodiment of the power factor correction IC 26, includes a terminal A, and the voltage generated across the resistor 35 with the inductor current IL being passed therethrough upon turning on of the NMOS transistor 27 is applied to the terminal A. The power factor correction IC 26d is different from the power factor correction IC 26a in including an output circuit 63 as the output circuit and further including a load detection circuit 72 that detects the state of the load 11 based on the voltage at the terminal A. Note that parts or elements that are similar to those in the power factor correction IC 26a in FIG. 2 are given the same reference numerals.

The load detection circuit 72 detects the state of the load 11. Specifically, the load detection circuit 72 outputs a detection voltage Vload corresponding to a load current Iload flowing through the load 11 based on the voltage at the terminal A.

Figure 14:
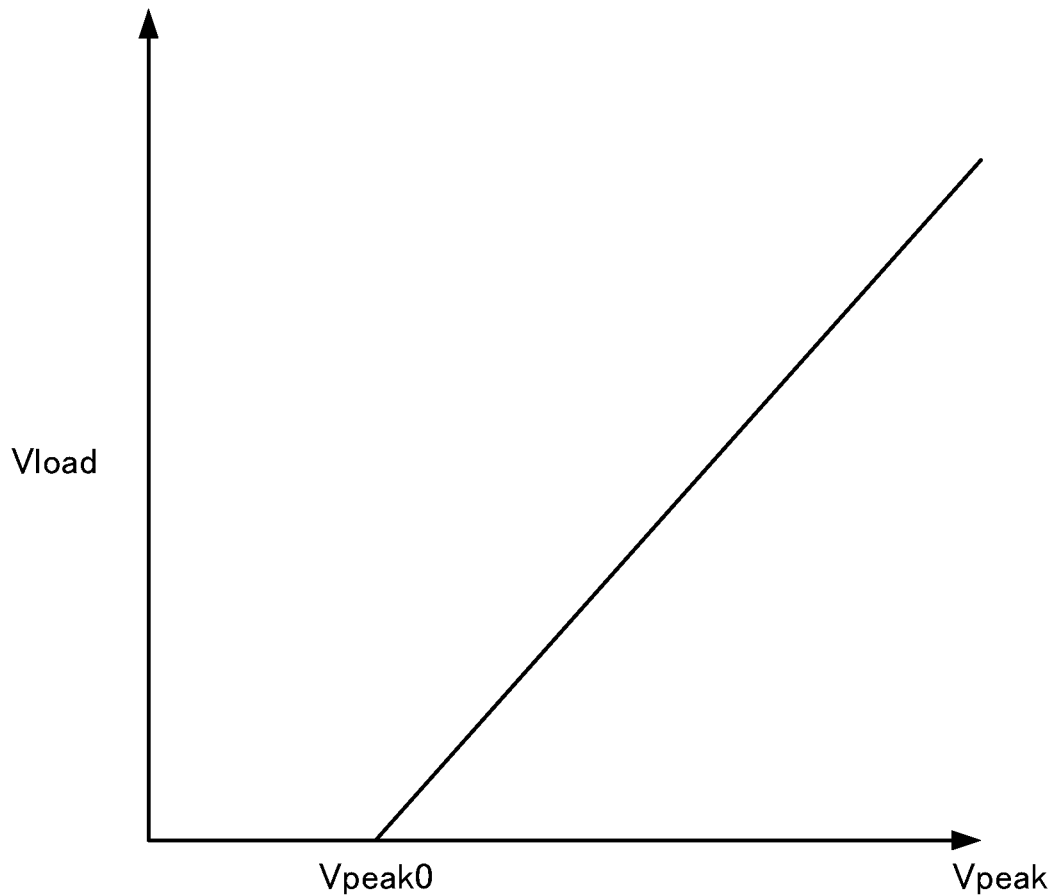
FIG. 14 is a diagram illustrating a relationship between a peak voltage Vpeak and a detection voltage Vload.

FIG. 14 is a diagram illustrating a relationship between a peak voltage Vpeak and the detection voltage Vload. The peak voltage Vpeak herein is a voltage indicating a peak voltage of a voltage applied to the terminal A when the inductor current IL flows through the resistor 35 upon turning on of the NMOS transistor 27.

As illustrated in FIG. 14, when the peak voltage Vpeak exceeds a voltage value Vpeak0, the load detection circuit 72 outputs the detection voltage Vload that is proportional to a voltage value obtained by subtracting the voltage value Vpeak0 from a voltage value of the peak voltage Vpeak. On the other hand, when the peak voltage Vpeak does not exceed the voltage value Vpeak0, the detection voltage Vload is zero. The voltage value Vpeak0 corresponds to a "second predetermined value".

<<<Configuration of Output Circuit 63>>>

Figure 15:
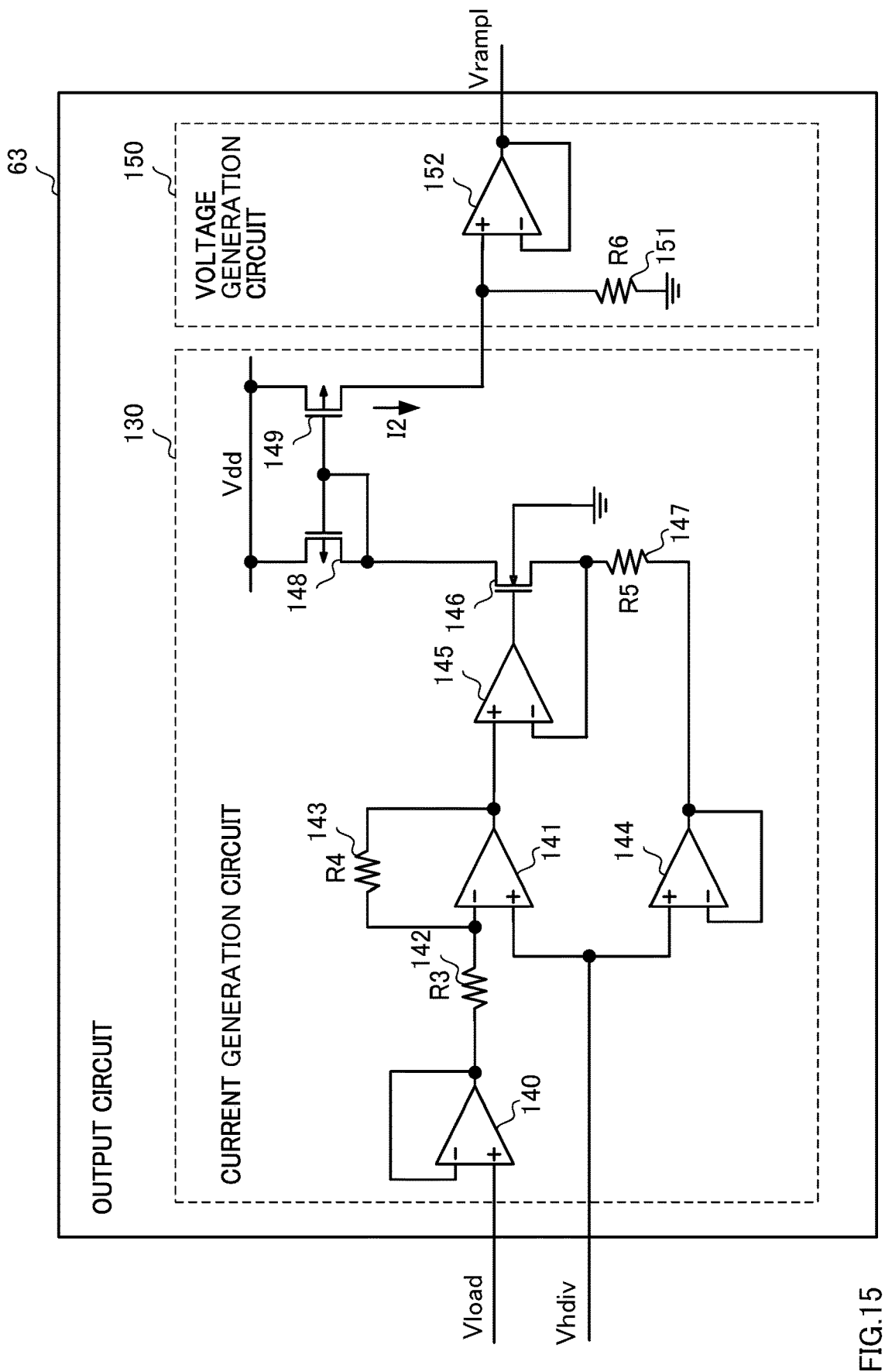
FIG. 15 is a diagram illustrating an example of an output circuit 63.

FIG. 15 is a diagram illustrating an example of the output circuit 63. The output circuit 63 outputs, to the oscillator circuit 40, a voltage corresponding to a difference between the divided voltage Vhdiv and the detection voltage Vload, in place of the voltage Vcomp in the output circuit 62, as the bias voltage Vramp1. The output circuit 63 includes the current generation circuit 130 and the voltage generation circuit 150.

The current generation circuit 130 and the voltage generation circuit 150 are the same as those in the output circuit 62. Thus, the output circuit 63 outputs the bias voltage Vramp1 given by the following expression.

$$V\text{ramp}1 = K0 \times (V\text{hdiv} - V\text{load}) \times R4/R3/R5 \times R6 \quad (9)$$

<<<Operation of Power Factor Correction IC 26d>>>

Figure 16:
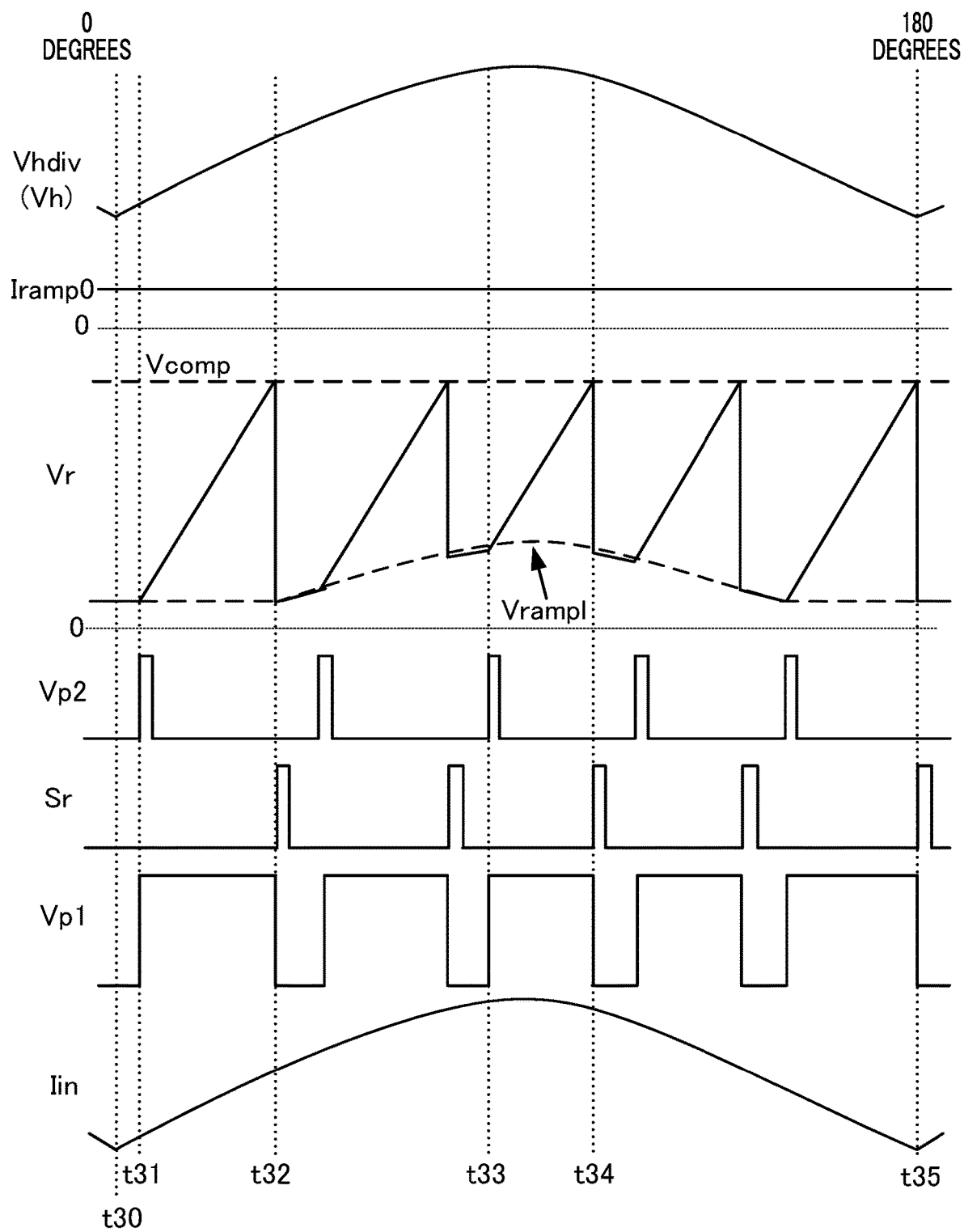
FIG. 16 is a diagram illustrating an operation of a power factor correction IC 26d when a load 11 is a heavy load.

FIG. 16 is a diagram illustrating an operation of the power factor correction IC 26d when the load 11 is a heavy load. The operation of the power factor correction IC 26d is different from the operation of the power factor correction IC 26c illustrated in FIG. 11 in that the bias voltage Vramp1 is generated from the divided voltage Vhdiv and the detection voltage Vload. However, the relationship between the bias voltage Vramp1 and the on-time of the NMOS transistor 27 is similar between the power factor correction ICs 26c and 26d. Since the operation of the power factor correction IC 26d is the same as the operation of the power factor correction IC 26c except the above, a description thereof is omitted. Time t30 to time t35 in FIG. 16 corresponds to time t20 to time t25 in FIG. 11.

It is understood from the operation described above that, in the power factor correction IC 26d, the on-time of the NMOS transistor 27 is longer than that in the power factor correction IC 26a in the vicinity of a range in which the level of the voltage Vh is high, that is, in which the absolute value of the AC voltage Vac is large. Accordingly, as with the power factor correction IC 26c, the power factor correction IC 26d can pass a large amount of the inductor current IL in the vicinity of the range in which the absolute value of the AC voltage Vac is large, that is, in a high phase angle region. Thus, the power factor correction IC 26d can shape the waveform of the input current Iin so as to be similar to the waveform of the AC voltage Vac even when the load 11 is a "heavy load". Consequently, the power factor correction IC 26d can improve the power factor and the THD.

Note that FIG. 16 illustrates only several pulses of the drive signal Vp1 to help understanding of the operation of the power factor correction IC 26d according to an embodiment of the present disclosure in FIG. 13. However, the NMOS transistor 27 has a switching frequency of several kHz, for example, which is sufficiently higher than the frequency of the AC voltage Vac of 50 to 60 Hz. Thus, in actuality, a numerous number of drive signals Vp1 are included in the time period of one cycle of the AC voltage Vac.

=====Configuration of Power Factor Correction IC 26e=====

Figure 17:
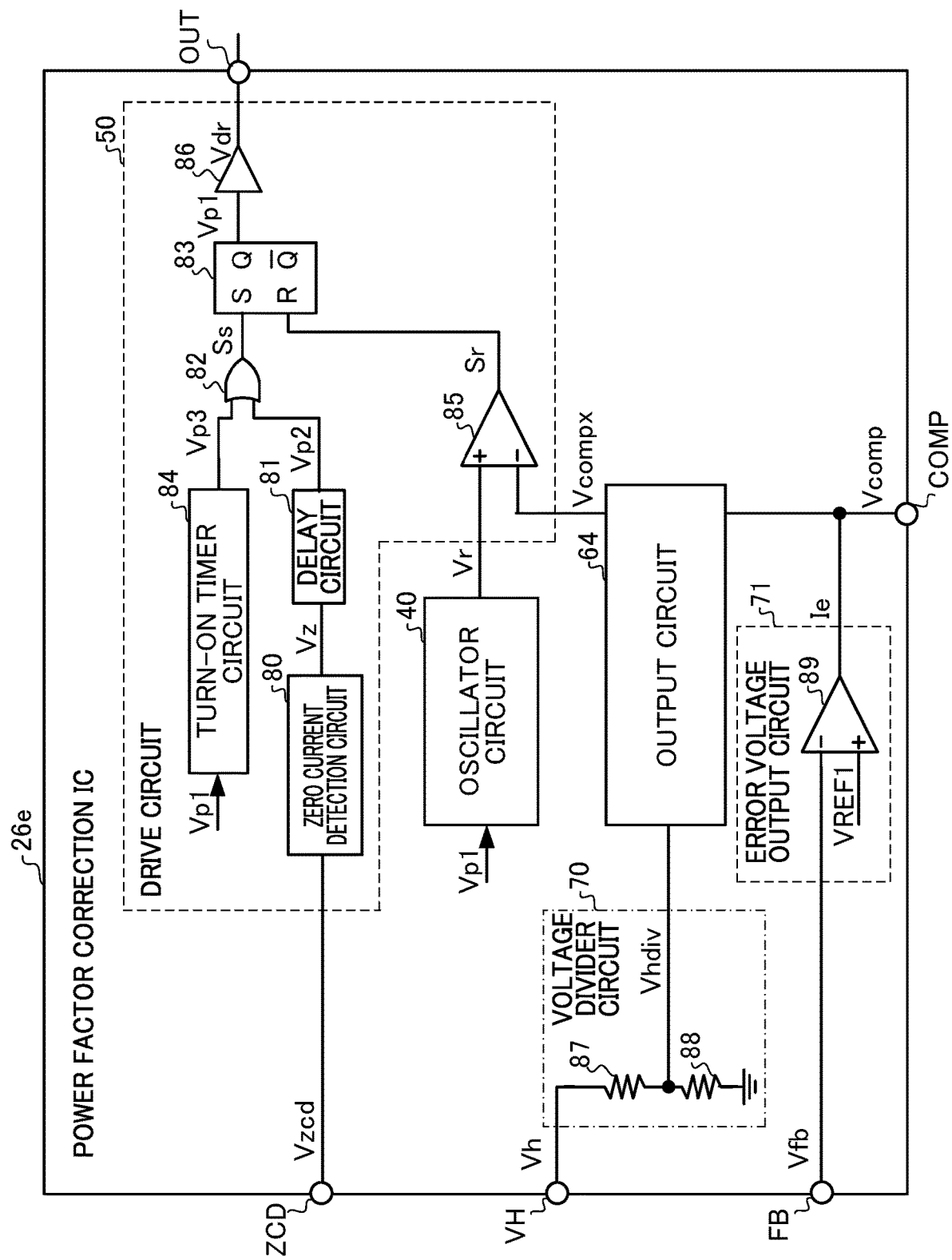
FIG. 17 is a diagram illustrating an example of a power factor correction IC 26e.

FIG. 17 is a diagram illustrating an example of a power factor correction IC 26e. The power factor correction IC 26e, which is a fifth embodiment of the power factor correction IC 26, is different from the power factor correction IC 26a in that the power factor correction IC 26e includes an output circuit 64 as the output circuit, and the bias voltage Vramp1 of the oscillator circuit 40 is a predetermined voltage. Note that parts or elements that are similar to those in the power factor correction IC 26a in FIG. 2 are given the same reference numerals.

<<<Configuration of Output Circuit 64>>>

Figure 18:
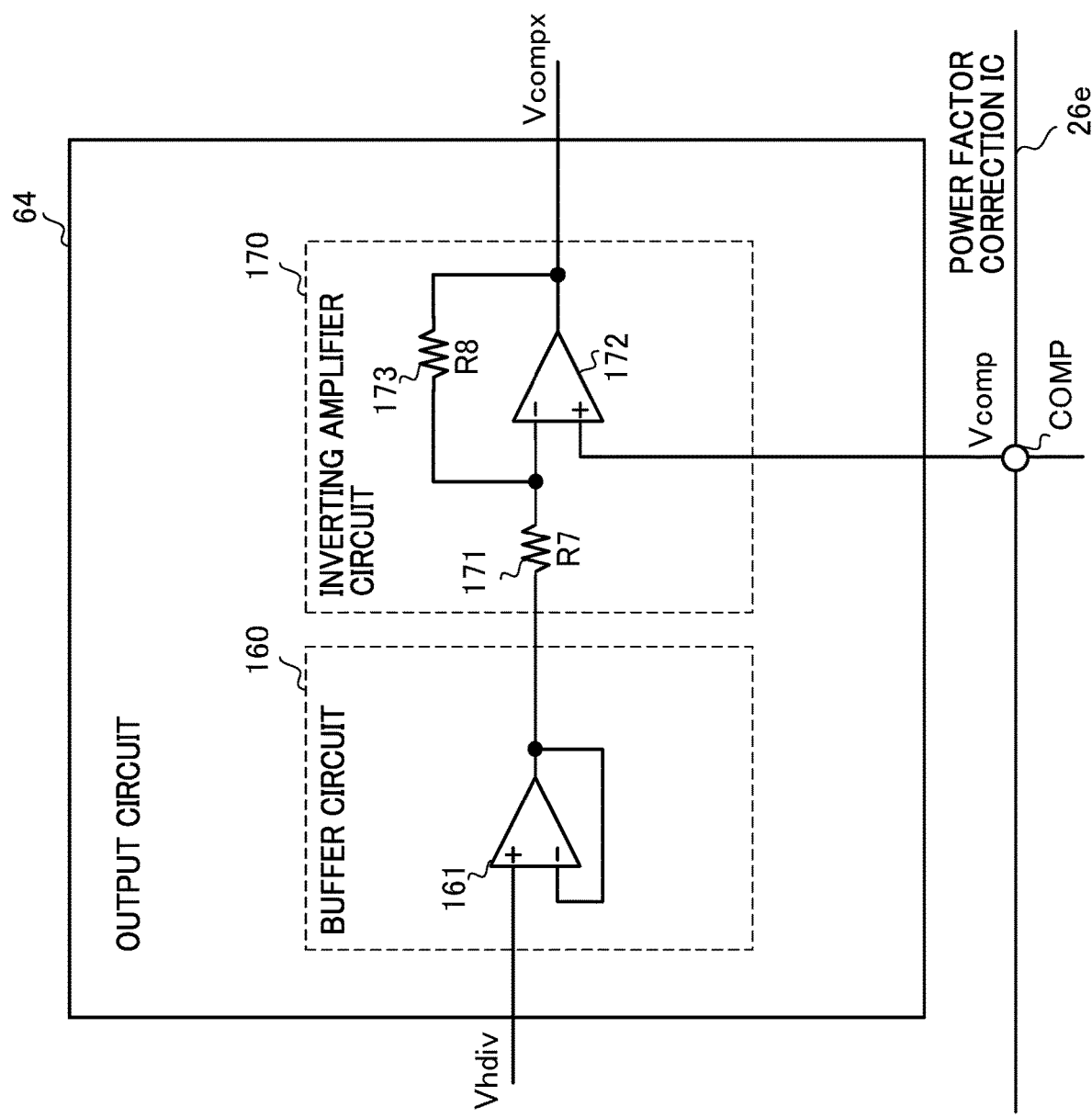
FIG. 18 is a diagram illustrating an example of an output circuit 64.

FIG. 18 is a diagram illustrating an example of the output circuit 64. The output circuit 64 outputs, to the comparator 85, a voltage Vcompx corresponding to the difference between the divided voltage Vhdiv and the voltage Vcomp. Specifically, when the level of the divided voltage Vhdiv rises, the output circuit 64 outputs the voltage Vcompx obtained by lowering the voltage Vcomp, and when the level of the divided voltage Vhdiv drops, the output circuit 64 outputs the voltage Vcompx obtained by raising the voltage Vcomp.

The output circuit 64 includes a buffer circuit 160 and an inverting amplifier circuit 170. The buffer circuit 160 includes an operational amplifier 161. The operational amplifier 161 configures a buffer circuit that outputs the divided voltage Vhdiv applied to a non-inverting input terminal thereof.

The inverting amplifier circuit 170 inverts and amplifies an output voltage of the operational amplifier 161. The inverting amplifier circuit 170 includes resistors 171 and 173 and an operational amplifier 172. An output voltage of the inverting amplifier circuit 170, that is, the voltage Vcompx is given by the following expression.

$$Vcompx = -R8/R7 \times (Vhdiv - Vcomp) + Vcomp \qquad (10)$$

<<<Operation of Power Factor Correction IC 26e>>>

Figure 19:
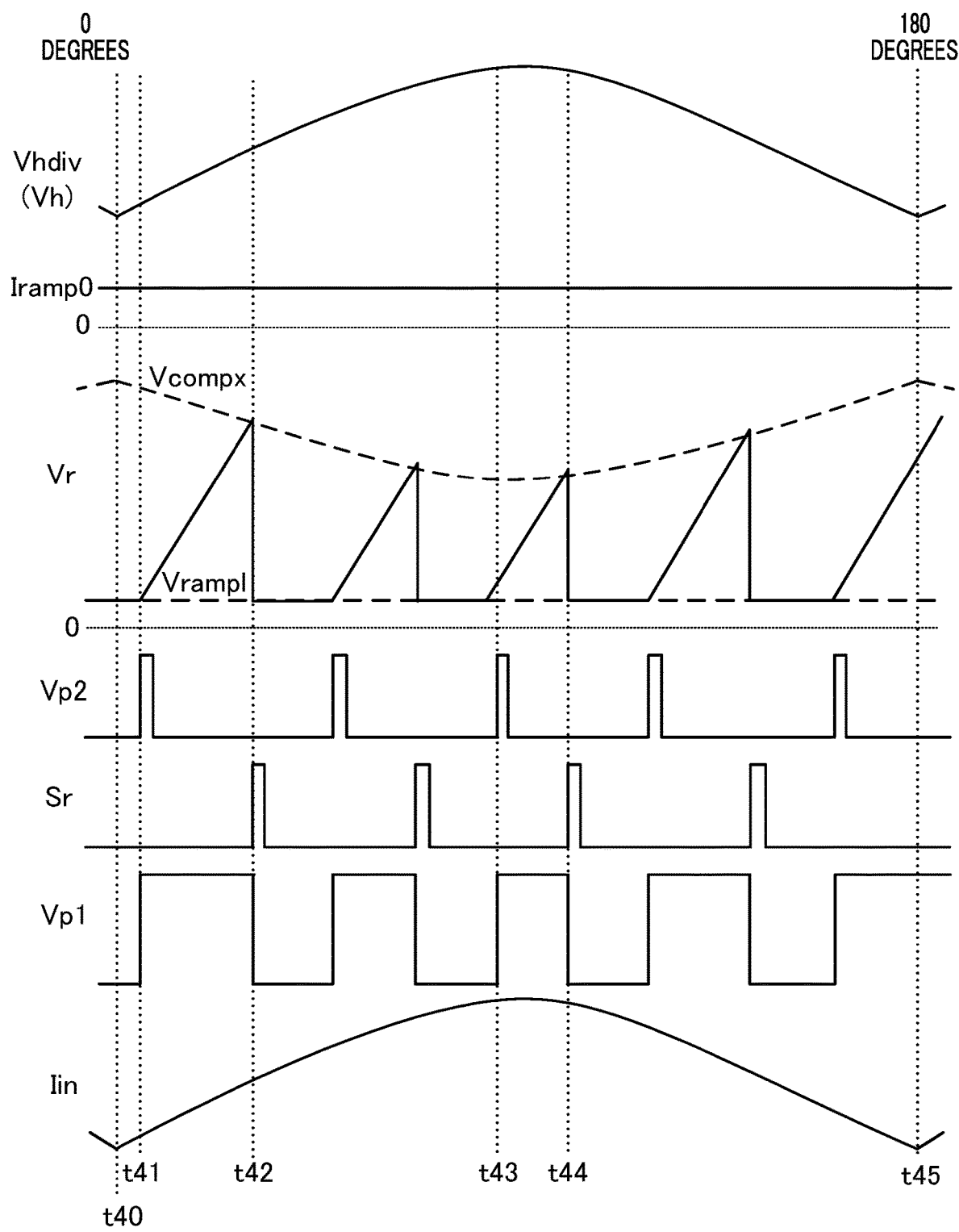
FIG. 19 is a diagram illustrating an operation of a power factor correction IC 26e.

FIG. 19 is a diagram illustrating an operation of the power factor correction IC 26e. At time t40, the phase angle of the voltage Vh obtained by full-wave rectifying the AC voltage Vac is 0 degrees, and the divided voltage Vhdiv obtained by dividing the voltage Vh has the lowest level. Then, the output circuit 64 outputs the voltage Vcompx based on the divided voltage Vhdiv and the voltage Vcomp. Then, the voltage Vcompx gradually drops from time t40 to time t43. Accordingly, the on-time of the NMOS transistor 27 gradually decreases.

When the inductor current IL becomes smaller than substantially zero at time t41, the delay circuit 81 outputs the high pulse signal Vp2. Then, the SR flip-flop 83 outputs the high drive signal Vp1, and as a result, the power factor correction IC 26e turns on the NMOS transistor 27.

When the NMOS transistor 27 is turned on, the charge-discharge circuit 90 starts charging the capacitor 110 with the constant current Iramp0. Then, the oscillator voltage Vr results in a voltage obtained by adding the bias voltage Vramp1, which is a predetermined voltage, and the voltage of the capacitor 110. In this process, since the capacitor 110 is charged with the constant current Iramp0, the oscillator voltage Vr gradually rises with a predetermined slope.

When the oscillator voltage Vr reaches the voltage Vcompx at time t42, the comparator 85 outputs the high reset signal Sr. Accordingly, the SR flip-flop 83 outputs the low drive signal Vp1, and as a result, the power factor correction IC 26e turns off the NMOS transistor 27.

When the NMOS transistor 27 is turned off, the charge-discharge circuit 90 discharges the capacitor 110, and the oscillator voltage Vr results in the bias voltage Vramp1, which is a predetermined voltage. Then, from time t42 to time t43, the power factor correction IC 26e repeats driving the NMOS transistor 27 similarly.

The power factor correction IC 26e turns on the NMOS transistor 27 at time t43, and the power factor correction IC 26e turns off the NMOS transistor 27 at time t44. The on-time of the NMOS transistor 27 from time t43 to time t44 is shorter than the on-time of the NMOS transistor 27 from time t41 to time t42. This is because the voltage level of the voltage Vcompx, which varies with the level of the voltage Vh, is lower in the period from time t43 to time t44 than that in the period from time t41 to time t42. Thus, the power factor correction IC 26e can decrease the on-time of the NMOS transistor 27 when the level of the voltage Vh rises. From time t44 to time t45, the power factor correction IC 26e repeats driving the NMOS transistor 27 similarly. At and after time t44, the divided voltage Vhdiv drops, and thus the voltage Vcompx gradually rises. Accordingly, the on-time of the NMOS transistor 27 gradually increases.

At time t45, the phase angle of the voltage Vh obtained by full-wave rectifying the AC voltage Vac is 180 degrees, and the divided voltage Vhdiv obtained by dividing the voltage Vh has the lowest level. Note that, in the power factor correction IC 26e in FIG. 17, the voltage Vcompx corresponds to a "second voltage".

It is understood from the operation described above that, in the power factor correction IC 26e, the on-time of the NMOS transistor 27 is longer in the vicinity of a range in which the level of the voltage Vh is low, that is, in which the absolute value of the AC voltage Vac is small. Accordingly, in the power factor correction IC 26e, a large amount of the inductor current IL can be passed in the vicinity of a range in which the absolute value of the AC voltage Vac is small, that is, in a low phase angle region, thereby being able to reduce the dead angle. Consequently, the power factor correction IC 26e can improve the power factor and the THD.

Note that FIG. 19 illustrates only several pulses of the drive signal Vp1 to help understanding of the operation of the power factor correction IC 26e according to an embodiment of the present disclosure in FIG. 17. However, the NMOS transistor 27 has a switching frequency of several kHz, for example, which is sufficiently higher than the frequency of the AC voltage Vac of 50 to 60 Hz. Thus, in actuality, a numerous number of drive signals Vp1 are included in the time period of one cycle of the AC voltage Vac.

=====Configuration of Power Factor Correction IC 26f=====

Figure 20:
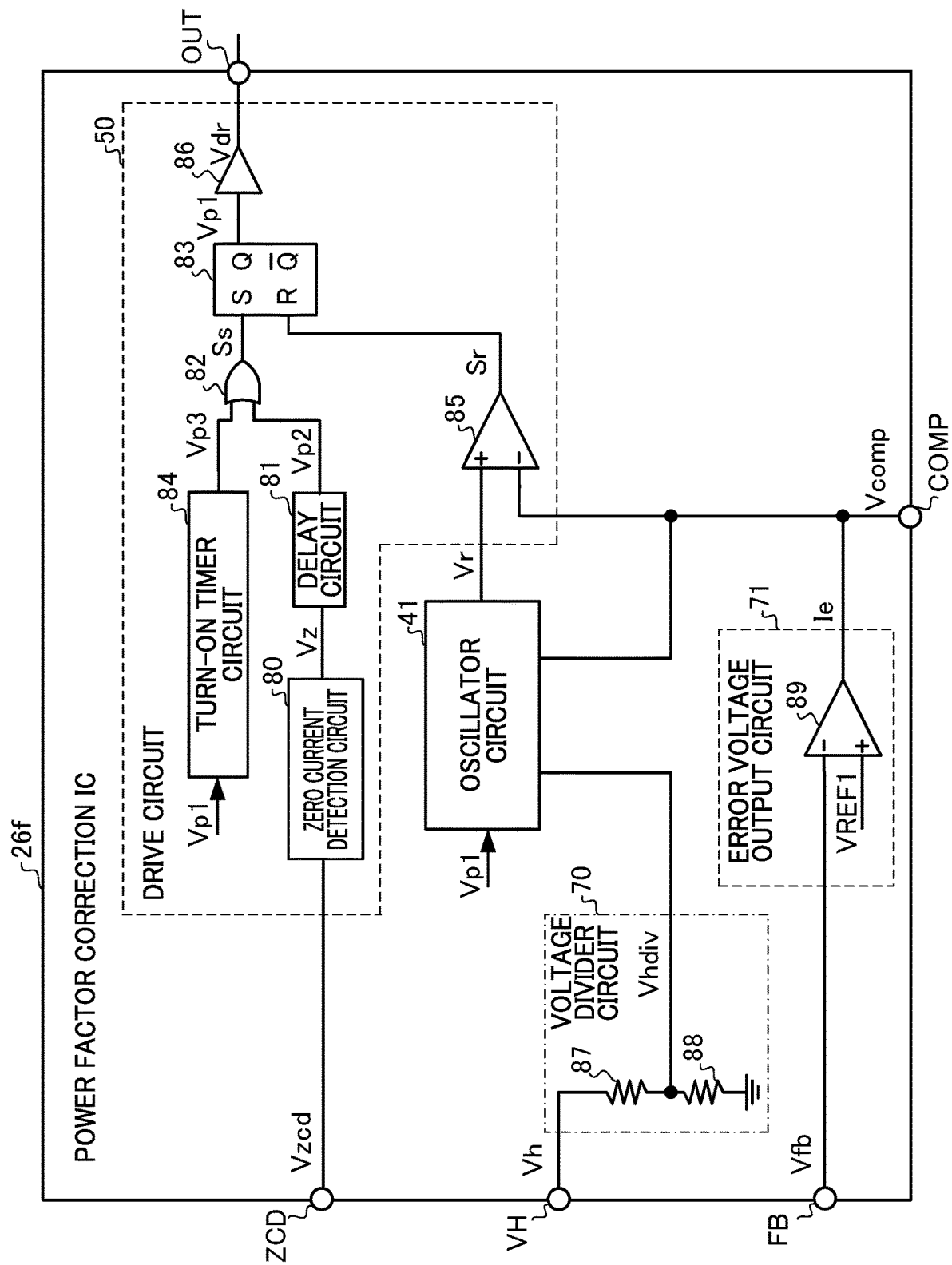
FIG. 20 is a diagram illustrating an example of a power factor correction IC 26f.

FIG. 20 is a diagram illustrating an example of a power factor correction IC 26f. The power factor correction IC 26f, which is a sixth embodiment of the power factor correction IC 26, is different from the power factor correction IC 26a in including an oscillator circuit 41 without including an output circuit. Note that parts or elements that are similar to those in the power factor correction IC 26a in FIG. 2 are given the same reference numerals.

<<<Configuration of Oscillator Circuit 41>>>

Figure 21:
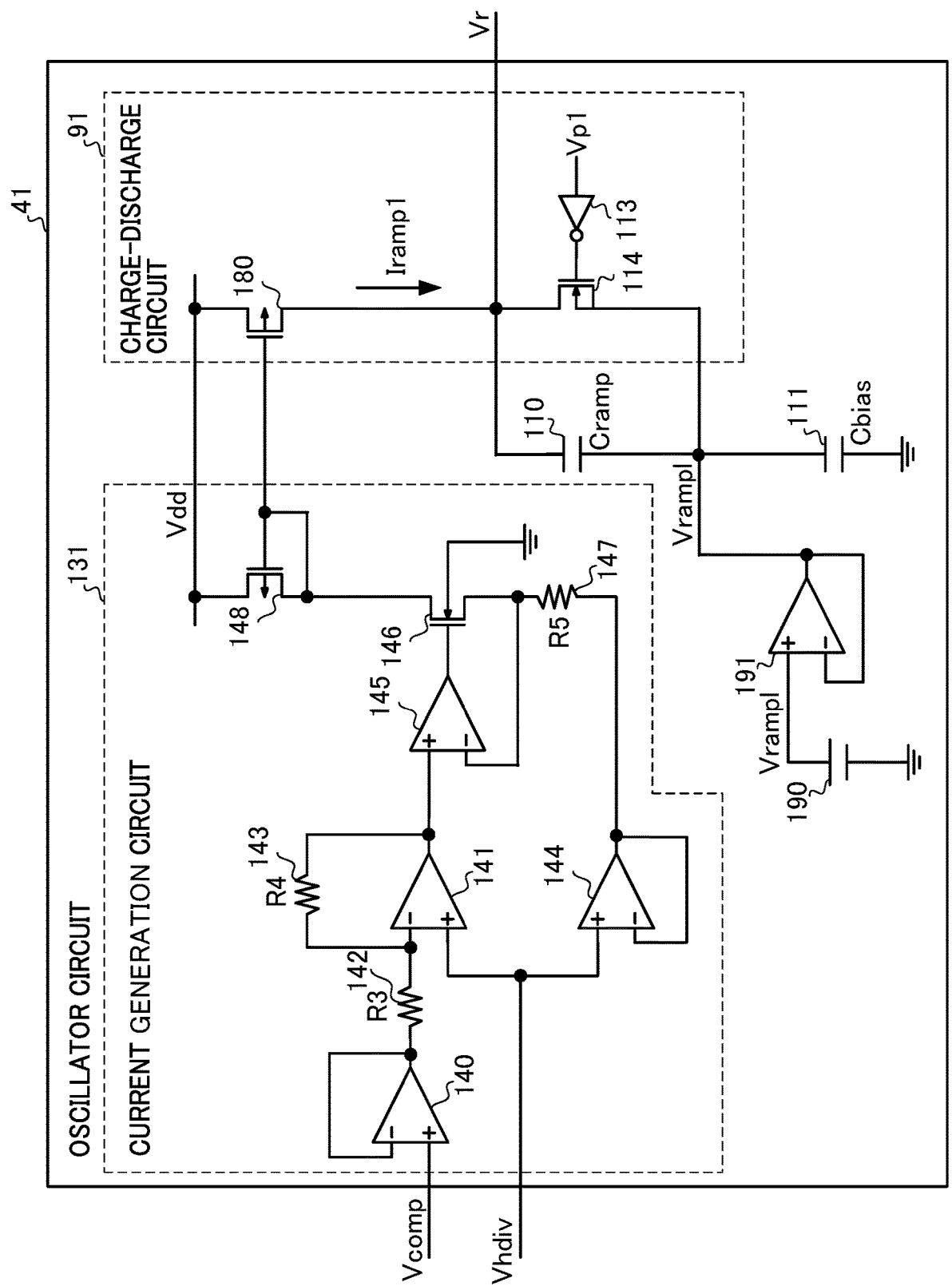
FIG. 21 is a diagram illustrating an example of an oscillator circuit 41.

FIG. 21 is a diagram illustrating an example of the oscillator circuit 41. The oscillator circuit 41 changes the slope of the oscillator voltage Vr based on the divided voltage Vhdiv and the voltage Vcomp and outputs the oscillator voltage Vr. Specifically, the oscillator circuit 41 changes the slope of the oscillator voltage Vr such that the on-time of the NMOS transistor 27 decreases when the level of the divided voltage Vhdiv rises and the on-time of the NMOS transistor 27 increases when the feedback voltage Vfb drops, and outputs the oscillator voltage Vr with the slope thereof changed.

The oscillator circuit 41 includes a current generation circuit 131, a charge-discharge circuit 91, the capacitors 110 and 111, a constant voltage source 190, and an operational amplifier 191. The current generation circuit 131 is substantially the same as the current generation circuit 130, and the charge-discharge circuit 91 includes a PMOS transistor 180 in place of the PMOS transistor 149 included in the current generation circuit 130.

The charge-discharge circuit 91 charges and discharges the capacitor 110 with a current Iramp1, and generates the oscillator voltage Vr whose slope changes with the current Iramp1. The charge-discharge circuit 91 includes the inverter 113, the NMOS transistor 114, and the PMOS transistor 180.

When the inductor current IL becomes substantially zero, and the high drive signal Vp1 is inputted, the NMOS transistor 114 is turned off, and the capacitor 110 is charged with the current Iramp1 from the PMOS transistor 180. The capacitor 111 is charged so as to hold the bias voltage Vramp1 outputted from the operational amplifier 191. The bias voltage Vramp1 herein is a voltage outputted by a buffer circuit that includes the operational amplifier 191 and the constant voltage source 190 that outputs the voltage Vramp1.

Thus, the oscillator voltage Vr results in a voltage obtained by adding the voltage of the capacitor 110 to the voltage of the capacitor 111 (i.e., the bias voltage Vramp1). When the high drive signal Vp1 is inputted, the voltage of the capacitor 110 that is charged with the current Iramp1 gradually rises, and accordingly the oscillator voltage Vr gradually rises, from the bias voltage Vramp1, with a slope according to the current Iramp1.

On the other hand, when the low drive signal Vp1 is inputted and the NMOS transistor 114 is turned on, the capacitor 110 is discharged. In this process, the charges stored in the capacitor 110 are drawn to the ground, through a transistor (not illustrated) in the output stage of the operational amplifier 191, the NMOS transistor 114, and the like. With the capacitor 110 being discharged, the oscillator voltage Vr results in being the bias voltage Vramp1.

When considered as with the current generation circuit 130 in FIG. 10, the current Iramp1 is given from the expression (6) as follows.

$$Iramp1 = K1 \times (Vhdiv - Vcomp) \times R4/R3/R5 \quad (11),$$

where a ratio K1 is a ratio corresponding to a size ratio between the PMOS transistors 148 and 180. Note that the current Iramp1 corresponds to a "charge current according to an error voltage and a voltage corresponding to a rectified voltage".

<<<Operation of Power Factor Correction IC 26f>>>

Figure 22:
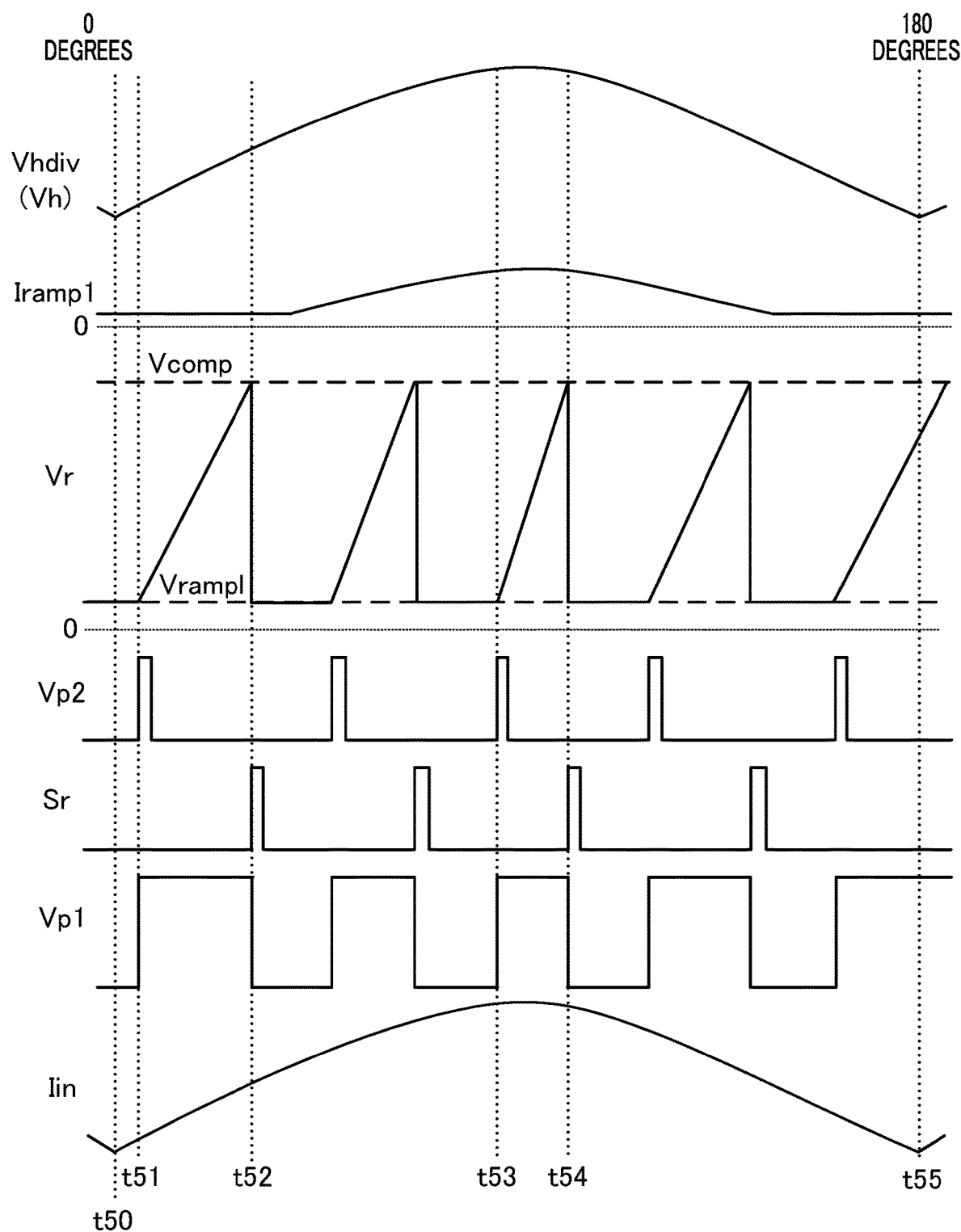
FIG. 22 is a diagram illustrating an example of an operation of a power factor correction IC 26f when a load 11 is a heavy load.

FIG. 22 is a diagram illustrating an example of an operation of the power factor correction IC 26f when the load 11 is a heavy load. At time t50, the phase angle of the voltage Vh obtained by full-wave rectifying the AC voltage Vac is 0 degrees, and the divided voltage Vhdiv obtained by dividing the voltage Vh has the lowest level. At time t50, the divided voltage Vhdiv is smaller than the voltage Vcomp, and thus the current Iramp1 is at a constant current value.

Then the inductor current IL becomes smaller than substantially zero at time t51, the delay circuit 81 outputs the high pulse signal Vp2. Then, the SR flip-flop 83 outputs the high drive signal Vp1, and as a result, the power factor correction IC 26f turns on the NMOS transistor 27.

When the NMOS transistor 27 is turned on, the charge-discharge circuit 91 starts charging the capacitor 110 with the current Iramp1. Then, the oscillator voltage Vr results in a voltage obtained by adding the bias voltage Vramp1, which is a predetermined voltage, and the voltage of the capacitor 110. In this process, the capacitor 110 is charged with the current Iramp1, and thus the oscillator voltage Vr gradually rises with a slope according to the current Iramp1.

When the oscillator voltage Vr reaches the voltage Vcomp at time t52, the comparator 85 outputs the high reset signal Sr. Then, the SR flip-flop 83 outputs the low drive signal Vp1, and as a result, the power factor correction IC 26f turns off the NMOS transistor 27.

When the NMOS transistor 27 is turned off, the charge-discharge circuit 91 discharges the capacitor 110, and the oscillator voltage Vr results in the bias voltage Vramp1, which is a predetermined voltage. Then, from time t52 to time t53, the power factor correction IC 26f repeats driving the NMOS transistor 27 similarly. At and after time t52, the divided voltage Vhdiv exceeds the voltage Vcomp, and thus the current Iramp1 increases with a rise in the divided voltage Vhdiv. Accordingly, the on-time of the NMOS transistor 27 gradually decreases.

The power factor correction IC 26f turns on the NMOS transistor 27 at time t53, and the power factor correction IC 26f turns off the NMOS transistor 27 at time t54. The on-time of the NMOS transistor 27 from time t53 to time t54 is shorter than the on-time of the NMOS transistor 27 from time t51 to time t52.

However, the voltage Vcomp rises higher and the current Iramp1 is smaller than in the case where the load 11 is a "light load". Thus, the on-time of the NMOS transistor 27 from time t50 to time t55 is longer than that in the case where the load 11 is a "light load". Thus, when the load 11 is a "heavy load", the power factor correction IC 26f passes the input current Iin more than in the case where the load 11 is a "light load".

Accordingly, the power factor correction IC 26f can shape the waveform of the average value of the inductor current IL (i.e., the input current Iin) so as to be similar to the waveform of the AC voltage Vac even when the load 11 is a "heavy load". From time t54 to time t55, the power factor correction IC 26f repeats driving the NMOS transistor 27 similarly. At and after time t54, the current Iramp1 decreases with a drop in the divided voltage Vhdiv. Accordingly, the on-time of the NMOS transistor 27 gradually increases.

At time t55, the phase angle of the voltage Vh obtained by full-wave rectifying the AC voltage Vac is 180 degrees, and the divided voltage Vhdiv obtained by dividing the voltage Vh has the lowest level.

It is understood from the operation described above that, in the power factor correction IC 26f, the on-time of the NMOS transistor 27 increases in the vicinity of a range in which the level of the voltage Vh is low, that is, in which the absolute value of the AC voltage Vac is small. Accordingly, in the power factor correction IC 26f, a large amount of the inductor current IL can be passed in the vicinity of the range in which the absolute value of the AC voltage Vac is small, that is, in a low phase angle region, thereby being able to reduce the dead angle. With the capacitor 111 holding the bias voltage Vramp1, the oscillator voltage Vr is less likely to be affected by noises generated in the ground voltage.

Further, in the power factor correction IC 26f, when the load 11 is a "heavy load", the on-time of the NMOS transistor 27 increases in the vicinity of a range in which the level of the voltage Vh is high, that is, in which the absolute value of the AC voltage Vac is large. Accordingly, in the power factor correction IC 26f, a large amount of the inductor current IL can be passed in the vicinity of a range in which the absolute value of the AC voltage Vac is large, that is, in a high phase angle region. Thus, the power factor correction IC 26f can shape the waveform of the input current Iin so as to be similar to the waveform of the AC voltage Vac even when the load 11 is a "heavy load". Consequently, the power factor correction IC 26f can improve the power factor and the THD.

Note that FIG. 22 illustrates only several pulses of the drive signal Vp1 to help understanding of the operation of the power factor correction IC 26f according to an embodiment of the present disclosure in FIG. 20. However, the NMOS transistor 27 has a switching frequency of several kHz, for example, which is sufficiently higher than the frequency of the AC voltage Vac of 50 to 60 Hz. Thus, in actuality, a numerous number of drive signals Vp1 are included in the time period of one cycle of the AC voltage Vac.

=====Configuration of Power Factor Correction IC 26g=====

Figure 23:
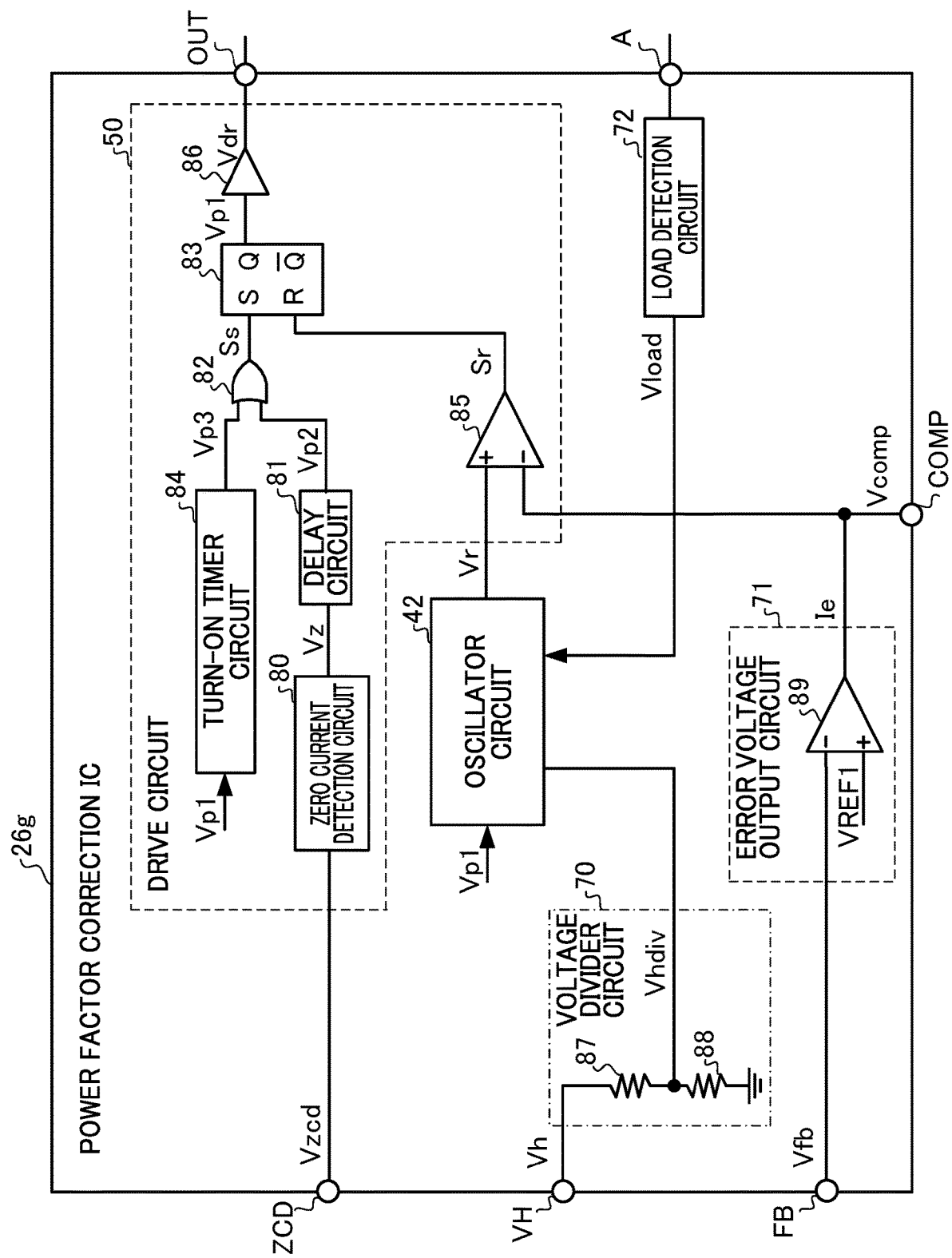
FIG. 23 is a diagram illustrating an example of a power factor correction IC 26g.

FIG. 23 is a diagram illustrating an example of a power factor correction IC 26g. The power factor correction IC 26g, which is a seventh embodiment of the power factor correction IC 26, is different from the power factor correction IC 26d in including an oscillator circuit 42 without including an output circuit. Note that parts or elements that are similar to those in the power factor correction IC 26a in FIG. 2 are given the same reference numerals.

<<<Configuration of Oscillator Circuit 42>>>

Figure 24:
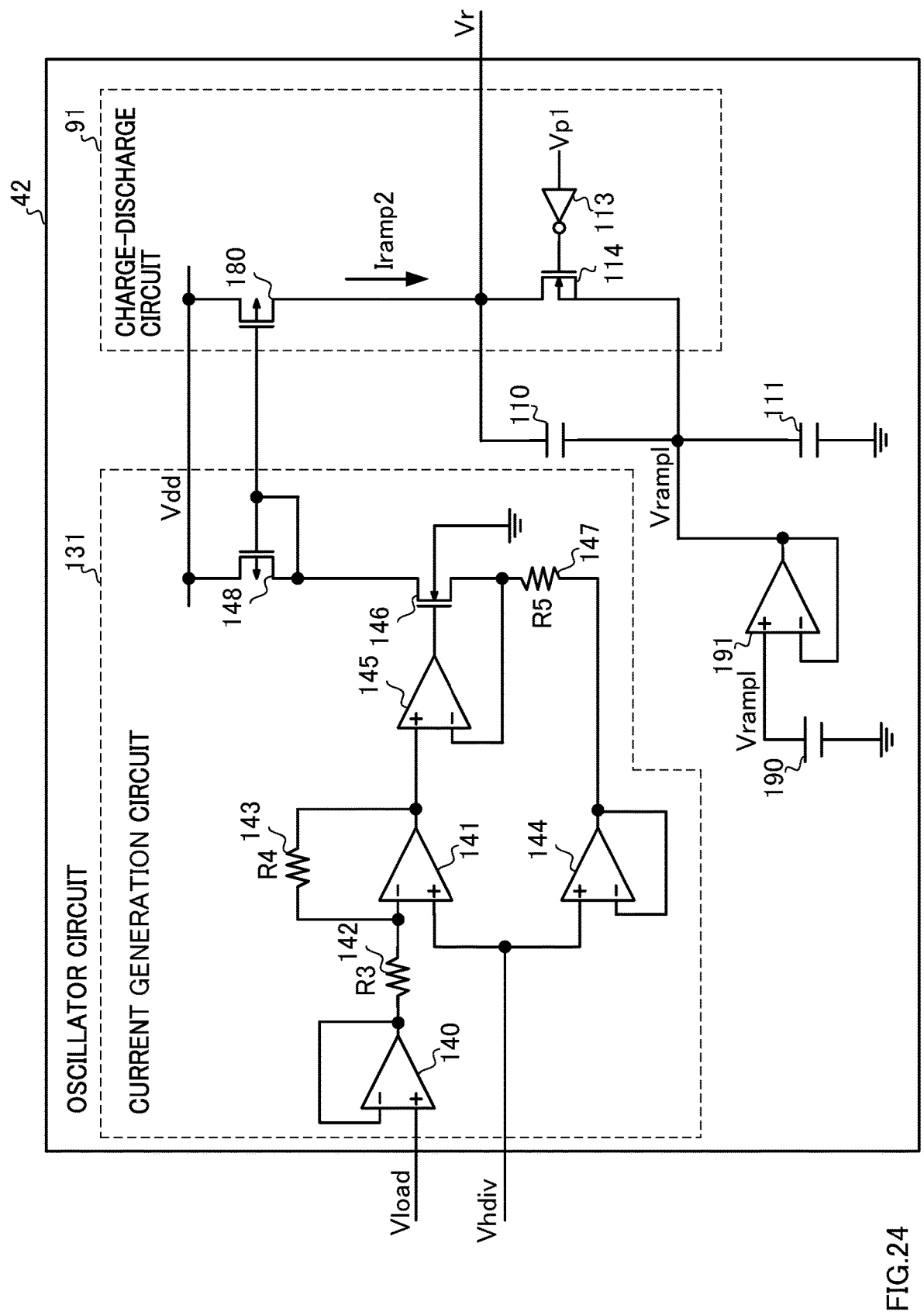
FIG. 24 is a diagram illustrating an example of an oscillator circuit 42.

FIG. 24 is a diagram illustrating an example of the oscillator circuit 42. The oscillator circuit 42 charges the capacitor 110 with a current Iramp2 corresponding to the difference between the divided voltage Vhdiv and the detection voltage Vload, in place of the voltage Vcomp in the oscillator circuit 41, and outputs the oscillator voltage Vr. The oscillator circuit 42 is configured with a circuit that is similar to the oscillator circuit 41.

Accordingly, when considered as with the current generation circuit 131 in FIG. 21, the current Iramp2 is given from the expression (11) as follows.

$$Iramp2=K1\times(Vhdiv-Vload)\times R4/R3/R5 \qquad (12)$$

Note that the current Iramp2 corresponds to a "charge current according to a detection voltage and a voltage corresponding to a rectified voltage".

<<<Operation of Power Factor Correction IC 26g>>>

Figure 25:
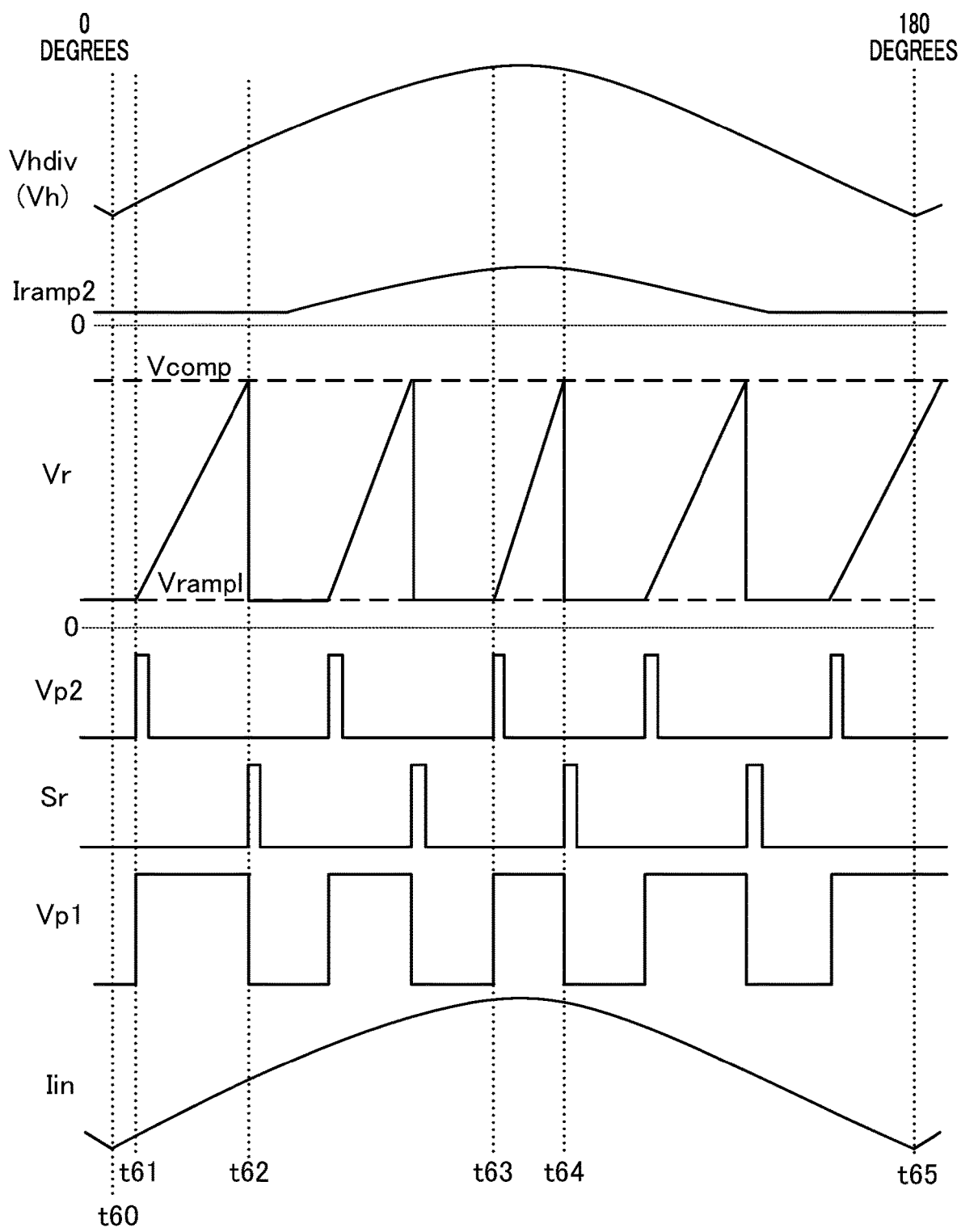
FIG. 25 is a diagram illustrating an example of an operation of a power factor correction IC 26g when a load 11 is a heavy load.

FIG. 25 is a diagram illustrating an example of an operation of the power factor correction IC 26g when the load 11 is a heavy load. The operation of the power factor correction IC 26g is different from the operation of the power factor correction IC 26f illustrated in FIG. 20 in that the current Iramp2 is generated from the divided voltage Vhdiv and the detection voltage Vload. However, the relationship between the current Iramp2 and the on-time of the NMOS transistor 27 is similar between the power factor correction ICs 26f and 26g. Since the operation of the power factor correction IC 26g is the same as the operation of the power factor correction IC 26f except the above, a description thereof is omitted. Time t60 to time t65 in FIG. 25 corresponds to time t50 to time t55 in FIG. 22.

It is understood from the operation described above that, in the power factor correction IC 26g, the on-time of the NMOS transistor 27 increases in the vicinity of a range in which the level of the voltage Vh is low, that is, in which the absolute value of the AC voltage Vac is small. Accordingly, in the power factor correction IC 26g, a large amount of the inductor current IL can be passed in the vicinity of the range in which the absolute value of the AC voltage Vac is small, that is, in a low phase angle region, thereby being able to reduce the dead angle.

Further, in the power factor correction IC 26g, when the load 11 is a "heavy load", the on-time of the NMOS transistor 27 increases in the vicinity of a range in which the level of the voltage Vh is high, that is, in which the absolute value of the AC voltage Vac is large. Accordingly, in the power factor correction IC 26g, a large amount of the inductor current IL can be passed in the vicinity of the range in which the absolute value of the AC voltage Vac is large, that is, in a high phase angle region. Thus, the power factor correction IC 26g can shape the waveform of the input current Iin so as to be similar to the waveform of the AC voltage Vac even when the load 11 is a "heavy load". Consequently, the power factor correction IC 26g can improve the power factor and the THD.

Note that FIG. 25 illustrates only several pulses of the drive signal Vp1 to help understanding of the operation of the power factor correction IC 26g according to an embodiment of the present disclosure in FIG. 23. However, the NMOS transistor 27 has a switching frequency of several kHz, for example, which is sufficiently higher than the frequency of the AC voltage Vac of 50 to 60 Hz. Thus, in actuality, a numerous number of drive signals Vp1 are included in the time period of one cycle of the AC voltage Vac.

===Modifications===

Figure 26:
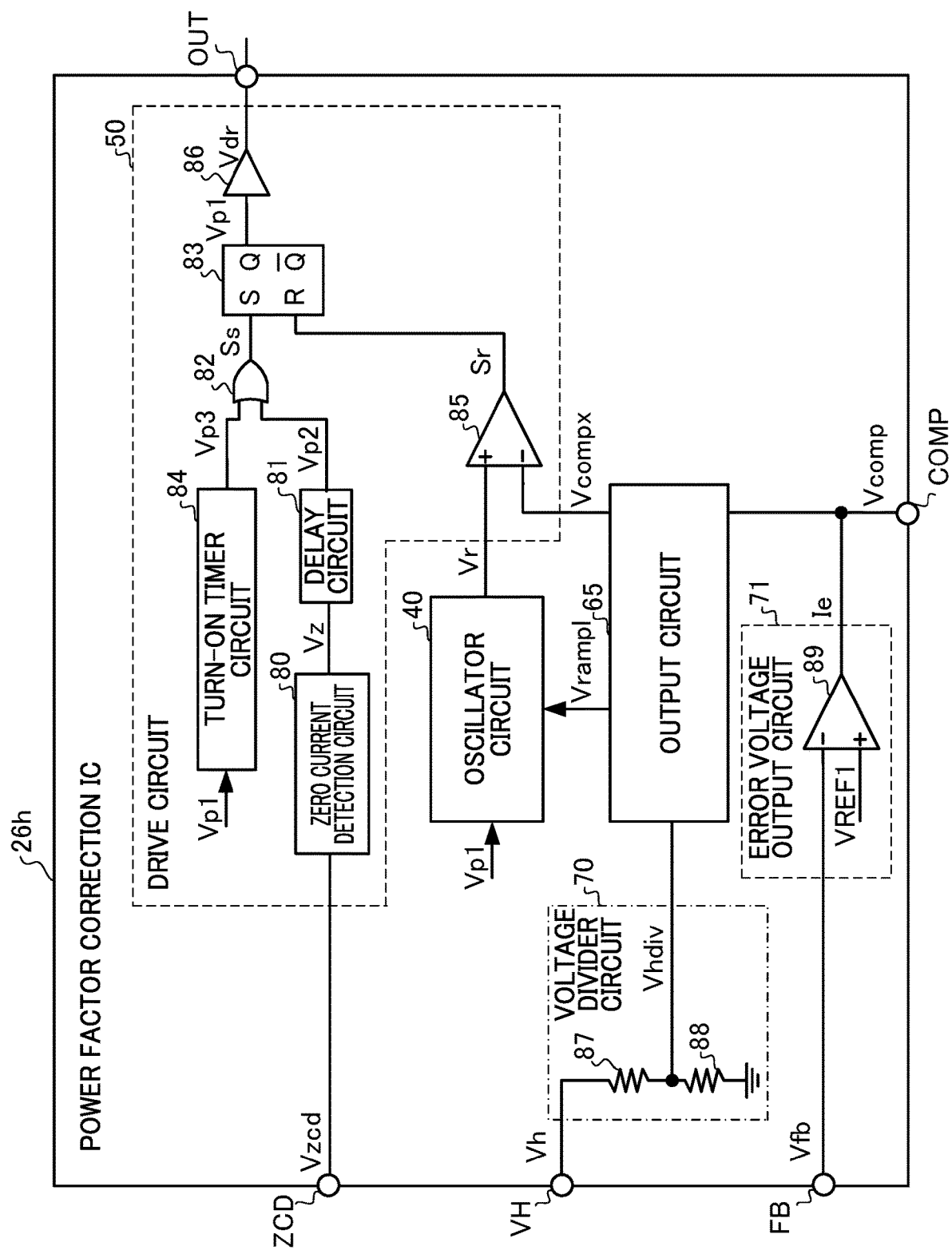
FIG. 26 is a diagram illustrating an example of a power factor correction IC 26h.

In embodiments of the present disclosure, an example has been described in which the bias voltage Vramp1 is changed with the level of the divided voltage Vhdiv in the power factor correction IC 26a. In addition, an example has also been described in which the voltage Vcompx is changed with the level of the divided voltage Vhdiv in the power factor correction IC 26e. However, an output circuit 65 may change the bias voltage Vramp1 and the voltage Vcompx according to the level of the divided voltage Vhdiv as illustrated in a power factor correction IC 26h of an eighth embodiment in FIG. 26. The output circuit 65 includes the output circuit 60, the buffer circuit 160, and the inverting amplifier circuit 170.

Further, in embodiments of the present disclosure, the voltage divider circuit 70 generates the divided voltage Vhdiv containing an AC component of the voltage Vh by dividing the voltage Vh that is obtained by full-wave rectifying the AC voltage Vac. However, an alternating current (AC) component detection circuit 200 illustrated in FIG. 27 may generate a voltage Vh_compo containing the AC component of the voltage Vh based on the voltage Vzcd from the auxiliary coil L2, and the power factor correction IC 26 may use the voltage Vh_compo instead of the divided voltage Vhdiv.

Figure 27:
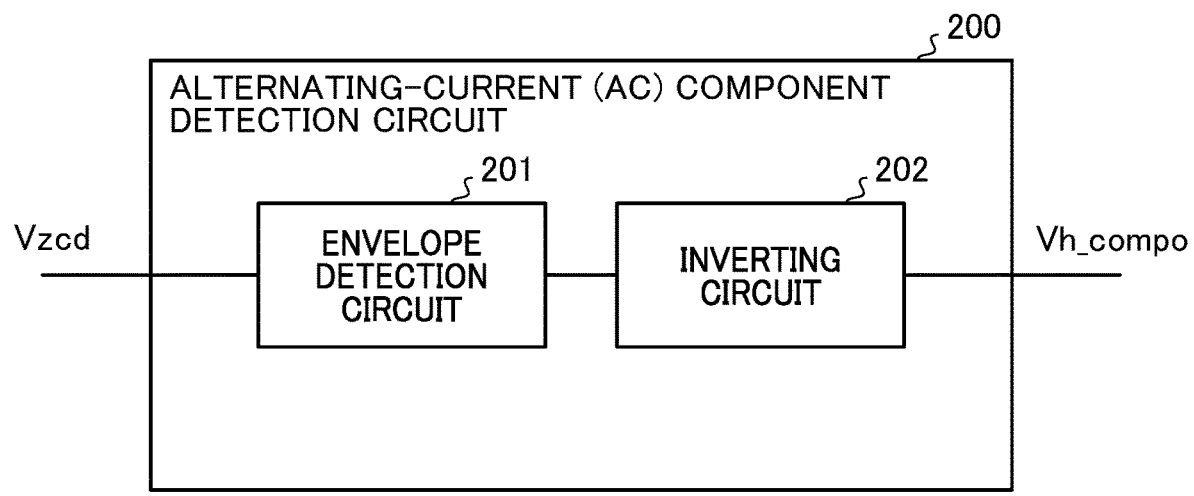
FIG. 27 is a diagram illustrating an example of an AC component detection circuit 200.

Specifically, as illustrated in FIG. 27, the AC component detection circuit 200 includes an envelope detection circuit 201 and an inverting circuit 202. The envelope detection circuit 201 detects a peak of the negative voltage of the voltage Vzcd which is opposite in polarity to the voltage generated in the main coil L1. The inverting circuit 202 inverts the detected peak and outputs the inverted peak as the voltage Vh_compo. Accordingly, the AC component detection circuit 200 outputs the voltage Vh_compo of the same polarity as that of the voltage generated in the main coil L1, based on the voltage Vzcd.

===Summary===

The AC-DC converters 10a and 10b according to embodiments of the present disclosure have been described above. The oscillator circuit 40 outputs the oscillator voltage Vr that rises, from the bias voltage Vramp1, with a predetermined slope according to the constant current Iramp0. Accordingly, although details will be described later, for example, the power factor correction IC 26a reduces a variation in each switching cycle of the on-time of the NMOS transistor 27 caused by a noise component in the voltage Vcomp. For example, the output circuit 60 changes the bias voltage Vramp1 based on the divided voltage Vhdiv such that the on-time of the NMOS transistor 27 decreases when the level of the divided voltage Vhdiv rises, and outputs the changed bias voltage Vramp1. Further, the output circuit 64 changes the voltage Vcompx based on the divided voltage Vhdiv such that the on-time of the NMOS transistor 27 decreases when the level of the divided voltage Vhdiv rises, and outputs the changed voltage Vcompx. Furthermore, the output circuit 65 changes the bias voltage Vramp1 and the voltage Vcompx based on the divided voltage Vhdiv such that the on-time of the NMOS transistor 27 decreases when the level of the divided voltage Vhdiv rises, and outputs the changed bias voltage Vramp1 and voltage Vcompx. Accordingly, the on-time of the NMOS transistor 27 increases, and a large amount of the inductor current IL flows in the vicinity of a range in which the level of the divided voltage Vhdiv is low. With a large amount of the inductor current IL flowing therein, the voltage of the capacitor 22 drops, the difference between the absolute value of the AC voltage Vac and the voltage value of the capacitor 22 increases, and a current flows through the diodes (not illustrated) in the diode bridge configuring the full-wave rectifier circuit 21. This reduces the dead angle in the vicinity of a range in which the level of the divided voltage Vhdiv is low. Consequently, it is possible to provide an integrated circuit that appropriately changes the input current to improve the power factor.

Figure 28:
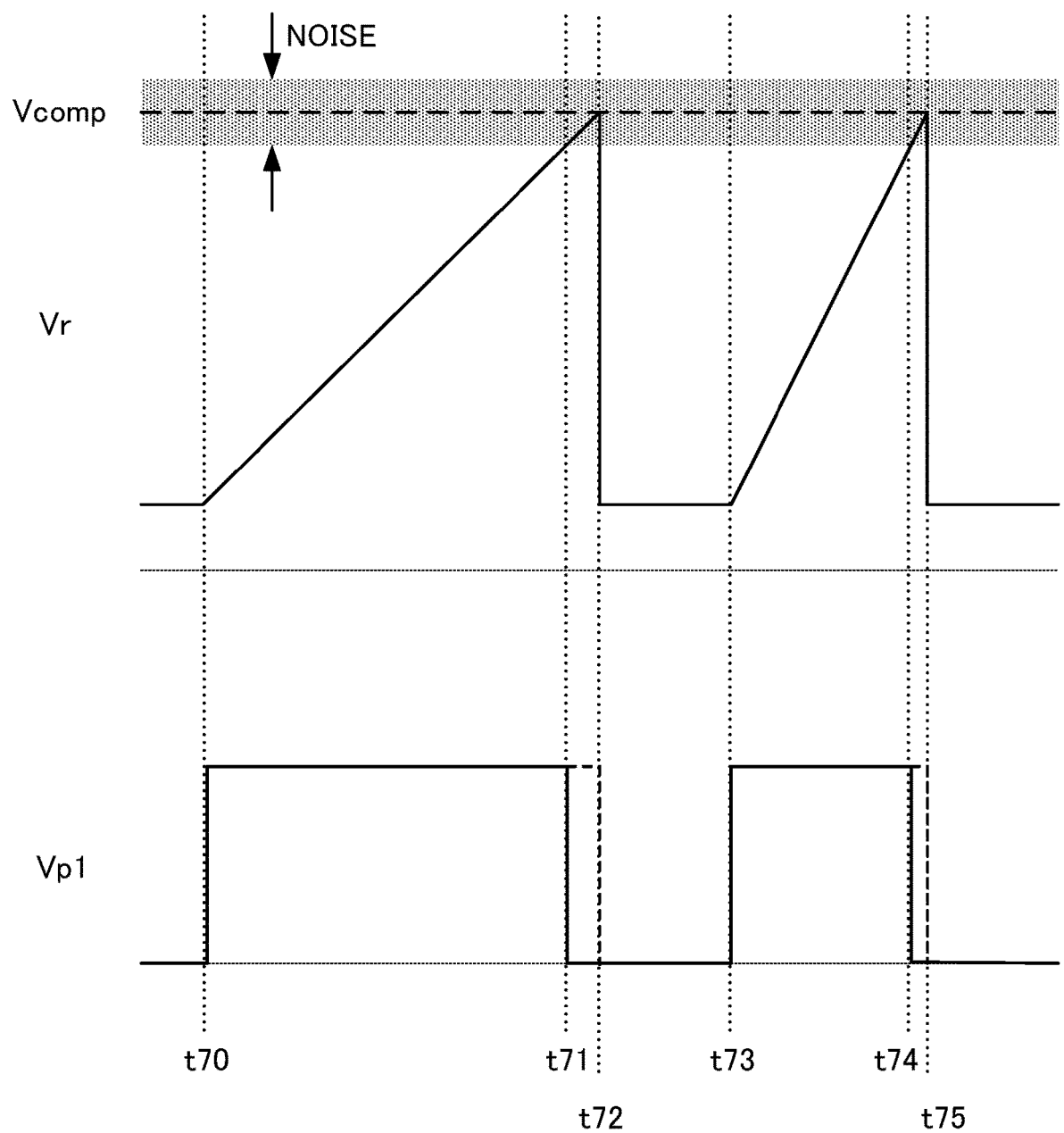
FIG. 28 is a diagram illustrating a variation in a drive signal Vp1 that is based on a voltage Vcomp containing a noise component and an oscillator voltage Vr.

FIG. 28 is a diagram illustrating a variation in the drive signal Vp1 based on the voltage Vcomp containing a noise component and the oscillator voltage Vr. At time t70, when the inductor current IL becomes substantially zero and the NMOS transistor 27 is turned on, the oscillator voltage Vr gradually rises with a first slope. Then, when the oscillator voltage Vr reaches the voltage level of the noise of the voltage Vcomp at time t71, the NMOS transistor 27 is turned off. However, in the case where there is no noise in the voltage Vcomp, the NMOS transistor 27 is turned off at time t72. Further, at time t73, when the inductor current IL becomes substantially zero and the NMOS transistor 27 is turned on, the oscillator voltage Vr gradually rises with a second slope steeper than the first slope. Then, at time t74, when the oscillator voltage Vr reaches the voltage level of the noise of the voltage Vcomp, the NMOS transistor 27 is turned off. However, in the case where there is no noise in the voltage Vcomp, the NMOS transistor 27 is turned off at time t75. Here, when comparing the period of time between time t71 and time t72 and the period of time between time t74 and time t75, it is understood that the gentler the slope of the oscillator voltage Vr is, the greater the variation in the on-time of the NMOS transistor 27 caused by the noise of the voltage Vcomp is. That is, if the slope of the oscillator voltage Vr varies, the variation in the on-time of the NMOS transistor in each switching cycle increases. Meanwhile, the oscillator circuit 40 outputs the oscillator voltage Vr that gradually rises with a constant slope by using the constant current Iramp0. Thus, for example, the power factor correction IC 26a can reduce the variation in the on-time of the NMOS transistor 27 in each switching cycle caused by the noise component of the voltage Vcomp.

Further, for example, the output circuit 60 changes the bias voltage Vramp1 based on the divided voltage Vhdiv such that the on-time of the NMOS transistor 27 decreases when the level of the divided voltage Vhdiv rises, and outputs the changed bias voltage Vramp1. Accordingly, the bias voltage Vramp1 containing less noise component is changed, thereby reducing the effects of the noise component of the voltage Vcomp.

Further, the oscillator circuit 40 includes the charge-discharge circuit 90 and the capacitor 110 coupled to the capacitor 111 for holding the bias voltage Vramp1. Thus, if there is no capacitor 111, and if the ground potential varies due to the effects of the switching noise, the oscillator voltage Vr also varies. However, the stable bias voltage Vramp1 is applied to the capacitor 111, thereby reducing the effects on the oscillator voltage Vr from the ground potential containing a noise component.

Further, the output circuit 60 is a buffer circuit that outputs the divided voltage Vhdiv as the bias voltage Vramp1. This enables the power factor correction IC 26a to change the on-time of the NMOS transistor 27 according to the divided voltage Vhdiv, thereby reducing the dead angle.

Further, the output circuit 61 is an amplifier circuit that amplifies the divided voltage Vhdiv by the gain G corresponding to the level of the divided voltage Vhdiv, and outputs the amplified divided voltage Vhdiv as the bias voltage Vramp1. This enables the power factor correction IC 26b to increase the on-time of the NMOS transistor 27 longer when the level of the divided voltage Vhdiv is low, thereby reducing the dead angle more.

Further, the output circuit 62 changes the bias voltage Vramp1 based on the divided voltage Vhdiv and the voltage Vcomp such that the on-time of the NMOS transistor 27 decreases when the level of the divided voltage Vhdiv rises, and outputs the changed bias voltage Vramp1. In addition, the output circuit 62 changes the bias voltage Vramp1 based on the divided voltage Vhdiv and the voltage Vcomp such that the on-time of the NMOS transistor 27 increases when the feedback voltage Vfb drops, and outputs the changed bias voltage Vramp1. Thus, when the load 11 is a "heavy load" and the feedback voltage Vfb drops, the on-time of the NMOS transistor 27 increases, and thus the waveform of the AC voltage Vac and the waveform of the input current Iin result in being similar even when the load 11 is a "heavy load".

Further, the output circuit 62 includes the current generation circuit 130 and the voltage generation circuit 150. Accordingly, although the output circuit 62 is a simple circuit, it is possible to output the bias voltage Vramp1 based on the divided voltage Vhdiv and the voltage Vcomp.

Further, the output circuit 63 changes the bias voltage Vramp1 based on the divided voltage Vhdiv and the detection voltage Vload such that the on-time of the NMOS transistor 27 decreases when the level of the divided voltage Vhdiv rises, and outputs the changed bias voltage Vramp1. In Addition, the output circuit 63 changes the bias voltage Vramp1 based on the divided voltage Vhdiv and the voltage Vload such that the on-time of the NMOS transistor 27 increases when the load current Iload rises, and outputs the changed bias voltage Vramp1. Accordingly, when the load 11 is a "heavy load" and the load current Iload increases, the on-time of the NMOS transistor 27 increases, and thus the waveform of the AC voltage Vac and the waveform of the input current Iin result in being similar even when the load 11 is a "heavy load".

Further, the output circuit 63 includes the current generation circuit 130 and the voltage generation circuit 150. Accordingly, although the output circuit 63 is a simple circuit, it is possible to output the bias voltage Vramp1 based on the divided voltage Vhdiv and the detection voltage Vload.

Further, the output circuit 64 changes the voltage Vcompx based on the divided voltage Vhdiv such that the on-time of the NMOS transistor 27 decreases when the level of the divided voltage Vhdiv rises, and outputs the changed voltage Vcompx. Thus, the on-time of the NMOS transistor 27 increases and a large amount of the inductor current IL flows in the vicinity of a range in which the level of the divided voltage Vhdiv is low. With a large amount of the inductor current IL flowing therein, the voltage of the capacitor 22 drops, the difference between the absolute value of the AC voltage Vac and the voltage value of the voltage across the capacitor 22 increases, and a current flows through the diodes (not illustrated) in the diode bridge configuring the full-wave rectifier circuit 21. This reduces the dead angle in the vicinity of the range in which the level of the divided voltage Vhdiv is low.

Further, the oscillator circuit 40 includes the charge-discharge circuit 90 and the capacitor 110 coupled to the capacitor 111 for holding the bias voltage Vramp1. Thus, if there is no capacitor 111, and if the ground potential varies due to the effects of the switching noise, the oscillator voltage Vr also varies. However, the stable bias voltage Vramp1 is applied to the capacitor 111, thereby reducing the effects on the oscillator voltage Vr from the ground potential containing a noise component.

Further, the output circuit 64 outputs the voltage Vcompx corresponding to the difference between the divided voltage Vhdiv and the voltage Vcomp to the comparator 85. Thus, the on-time of the NMOS transistor 27 increases and a large amount of the inductor current IL flows in the vicinity of the range in which the level of the divided voltage Vhdiv is low. With a large amount of the inductor current IL flowing therein, the voltage of the capacitor 22 drops, the difference between the absolute value of the AC voltage Vac and the voltage value of the voltage across the capacitor 22 increases, and a current flows through the diodes (not illustrated) in the diode bridge configuring the full-wave rectifier circuit 21. This reduces the dead angle in the vicinity of the range in which the level of the divided voltage Vhdiv is low.

Further, the output circuit 64 includes the buffer circuit 160 and the inverting amplifier circuit 170. Accordingly, although the power factor correction IC 26e is a simple circuit, it is possible to output the voltage Vcompx corresponding to the difference between the divided voltage Vhdiv and the voltage Vcomp to the comparator 85.

Further, the oscillator circuit 41 changes the slope of the oscillator voltage Vr such that the on-time of the NMOS transistor 27 decreases when the level of the divided voltage Vhdiv rises and the on-time of the NMOS transistor 27 increases when the feedback voltage Vfb drops, and outputs the oscillator voltage Vr with the slope thereof changed. Thus, when the load 11 is a "heavy load" and the feedback voltage Vfb drops, the on-time of the NMOS transistor 27 increases, and thus the waveform of the AC voltage Vac and the waveform of the input current Iin result in being similar even when the load 11 is a "heavy load".

Further, the oscillator circuit 41 changes the slope of the oscillator voltage Vr based on the divided voltage Vhdiv and the voltage Vcomp. Thus, the waveform of the AC voltage Vac and the waveform of the input current Iin result in being similar even when the load 11 is a "heavy load".

Further, the oscillator circuit 41 includes the charge-discharge circuit 91 and the capacitor 110 coupled to the capacitor 111 for holding a predetermined bias voltage Vramp1. Accordingly, although the oscillator circuit 41 is a simple circuit, it is possible to change the slope of the oscillator voltage Vr based on the divided voltage Vhdiv and the voltage Vcomp. If there is no capacitor 111, and if the ground potential varies due to the effects of the switching noise, the oscillator voltage Vr also varies. However, the stable bias voltage Vramp1 is applied to the capacitor 111, thereby reducing the effects on the oscillator voltage Vr from the ground potential containing the noise component.

Further, the oscillator circuit 42 changes the slope of the oscillator voltage Vr based on the divided voltage Vhdiv and the detection voltage Vload. Thus, when the load 11 is a "heavy load", and the detection voltage Vload rises, the on-time of the NMOS transistor 27 increases, and thus the waveform of the AC voltage Vac and the waveform of the input current Iin result in being similar even when the load 11 is a "heavy load".

Further, the oscillator circuit 42 includes the charge-discharge circuit 91 and the capacitor 110 coupled to the capacitor 111 for holding a predetermined bias voltage Vramp1. Accordingly, although the oscillator circuit 42 is a simple circuit, it is possible to change the slope of the oscillator voltage Vr based on the divided voltage Vhdiv and the detection voltage Vload. If there is no capacitor 111, and if the ground potential varies due to the effects of the switching noise, the oscillator voltage Vr also varies. However, the stable bias voltage Vramp1 is applied to the capacitor 111, thereby reducing the effects on the oscillator voltage Vr from the ground potential containing the noise component.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

According to the present disclosure, it is possible to provide an integrated circuit that appropriately changes an input current to improve the power factor.

What is claimed is:

1. An integrated circuit for a power supply circuit that generates an output voltage from an alternating current (AC) voltage inputted thereto, the power supply circuit including
a first capacitor to which a voltage corresponding to the AC voltage is to be applied,
an inductor to which the voltage corresponding to the AC voltage is to be applied, and
a transistor configured to control an inductor current flowing through the inductor,
the integrated circuit being configured to switch the transistor, the integrated circuit comprising:
an oscillator circuit configured to output an oscillator voltage that rises with a predetermined slope from a first voltage, upon the inductor current becoming smaller than a first predetermined value;
an error voltage output circuit configured to output an error voltage corresponding to a difference between a reference voltage and a feedback voltage corresponding to the output voltage;
a drive circuit configured to
turn on the transistor upon the inductor current becoming smaller than the first predetermined value, and
turn off the transistor upon the oscillator voltage reaching a second voltage that is based on the error voltage; and
an output circuit configured to change at least one voltage out of the first and second voltages based on a rectified voltage obtained by full-wave rectification of the AC voltage, such that an on-time of the transistor decreases when a level of the rectified voltage rises, and to output the changed at least one voltage.

2. The integrated circuit according to claim 1, wherein said at least one voltage is the first voltage.

3. The integrated circuit according to claim 2, wherein the oscillator circuit includes
a second capacitor having two ends, one of which is for the first voltage to be applied thereto, and
a charge-discharge circuit coupled to the other end of the second capacitor, the charge-discharge circuit being configured to generate the oscillator voltage by charging and discharging the second capacitor.

4. The integrated circuit according to claim 3, wherein
the output circuit is a buffer circuit, and
the first voltage is outputted by the buffer circuit and corresponds to the rectified voltage.

5. The integrated circuit according to claim 3, wherein
the output circuit is an amplifier circuit configured to amplify a voltage corresponding to the rectified voltage by a gain corresponding to the level of the rectified voltage, and output the amplified voltage as the first voltage.

6. The integrated circuit according to claim 1, wherein the output circuit
changes the first voltage based on the second voltage and a voltage corresponding to the rectified voltage, such that the on-time of the transistor decreases when the level of the rectified voltage rises, and increases when the output voltage drops, and outputs the changed first voltage.

7. The integrated circuit according to claim 6, wherein the output circuit includes
    a current generation circuit configured to generate a current corresponding to a difference between the second voltage and the voltage corresponding to the rectified voltage, and
    a voltage generation circuit configured to generate the first voltage based on the generated current.

8. The integrated circuit according to claim 1, further comprising:
    a load detection circuit configured to output a detection voltage corresponding to a load current flowing through a load of the power supply circuit, wherein
    the output circuit
        changes the first voltage based on the detection voltage and a voltage corresponding to the rectified voltage, such that the on-time of the transistor
            decreases when the level of the rectified voltage rises, and
            increases when the load current increases, and
        outputs the changed first voltage.

9. The integrated circuit according to claim 8, wherein the output circuit includes
    a current generation circuit configured to generate a current corresponding to a difference between the detection voltage and the voltage corresponding to the rectified voltage upon the detection voltage exceeding a second predetermined value, and
    a voltage generation circuit configured to generate the first voltage based on the generated current.

10. The integrated circuit according to claim 1, wherein said at least one voltage is the second voltage.

11. The integrated circuit according to claim 10, wherein the oscillator circuit includes
    a second capacitor having two ends, one of which is for the first voltage to be applied thereto, and
    a charge-discharge circuit coupled to the other end of the second capacitor, the charge-discharge circuit being configured to generate the oscillator voltage by charging and discharging the second capacitor.

12. The integrated circuit according to claim 11, wherein the output circuit outputs a voltage corresponding to a difference between the error voltage and a voltage corresponding to the rectified voltage, as the second voltage.

13. The integrated circuit according to claim 12, wherein the output circuit includes
    a buffer circuit configured to output the voltage corresponding to the rectified voltage, and
    an inverting amplifier circuit configured to output the second voltage corresponding to a difference between the error voltage and an output from the buffer circuit.

14. An integrated circuit for a power supply circuit that generates an output voltage from an alternating current (AC) voltage inputted thereto, the power supply circuit including
    a first capacitor to which a voltage corresponding to the AC voltage is to be applied,
    an inductor to which the voltage corresponding to the AC voltage is to be applied, and
    a transistor configured to control an inductor current flowing through the inductor,
the integrated circuit being configured to switch the transistor, the integrated circuit comprising:
    an oscillator circuit configured to output an oscillator voltage that rises upon the inductor current becoming smaller than a predetermined value;
    an error voltage output circuit configured to output an error voltage corresponding to a difference between a reference voltage and a feedback voltage corresponding to the output voltage; and
    a drive circuit configured to
        turn on the transistor upon the inductor current becoming smaller than the predetermined value, and
        turn off the transistor upon the oscillator voltage reaching the error voltage, wherein
    the oscillator circuit is further configured to
        change a slope of the oscillator voltage such that an on-time of the transistor
            decreases when a level of a rectified voltage obtained by full-wave rectification of the AC voltage rises, and
            increases when the output voltage drops, and
        output the oscillator voltage with the changed slope.

15. The integrated circuit according to claim 14, wherein the oscillator circuit changes the slope of the oscillator voltage based on the error voltage and a voltage corresponding to the rectified voltage.

16. The integrated circuit according to claim 15, wherein the oscillator circuit includes
    a second capacitor, and
    a charge-discharge circuit configured to generate the oscillator voltage by
        charging the second capacitor with a charge current upon the inductor current becoming smaller than the predetermined value, and
        discharging the second capacitor upon the oscillator voltage reaching the error voltage,
    the charge current being according to the error voltage and the voltage corresponding to the rectified voltage.

17. The integrated circuit according to claim 14, further comprising:
    a load detection circuit configured to output a detection voltage corresponding to a load current flowing through a load of the power supply circuit, wherein
    the oscillator circuit changes the slope of the oscillator voltage based on the detection voltage and a voltage corresponding to the rectified voltage.

18. The integrated circuit according to claim 17, wherein the oscillator circuit includes
    a second capacitor, and
    a charge-discharge circuit configured to generate the oscillator voltage by
        charging the second capacitor with a charge current upon the inductor current becoming smaller than the predetermined value, and
        discharging the second capacitor upon the oscillator voltage reaching an error voltage,
    the charge current being according to the detection voltage and the voltage corresponding to the rectified voltage.

19. A power supply circuit configured to generate an output voltage from an alternating current (AC) voltage inputted thereto, the power supply circuit comprising:
    a first capacitor to which a voltage corresponding to the AC voltage is to be applied;
    an inductor to which the voltage corresponding to the AC voltage is to be applied;
    a transistor configured to control an inductor current flowing through the inductor; and
    an integrated circuit configured to switch the transistor, the integrated circuit including an oscillator circuit configured to output an oscillator voltage that rises with a predetermined slope from a first voltage upon the inductor current becoming smaller than a predetermined value, an error voltage output circuit configured to output an error voltage corresponding to a difference between a reference voltage and a feedback voltage corresponding to the output voltage, a drive circuit configured to
- turn on the transistor upon the inductor current becoming smaller than the predetermined value and
- turn off the transistor upon the oscillator voltage reaching a second voltage that is based on the error voltage, and an output circuit configured to change at least one voltage out of the first and second voltages based on a rectified voltage obtained by full-wave rectification of the AC voltage, such that an on-time of the transistor decreases when a level of the rectified voltage rises, and to output the changed at least one voltage.

* * * * *